US010128994B2

(12) United States Patent
Webb et al.

(10) Patent No.: US 10,128,994 B2
(45) Date of Patent: *Nov. 13, 2018

(54) POWER DENSITY BOOSTING IN UPLINK SHARED CHANNELS

(71) Applicant: SONY CORPORATION, Tokyo (JP)

(72) Inventors: Matthew William Webb, Basingstoke (GB); John Christopher Clifton, Weybridge (GB)

(73) Assignee: Sony Corporation, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 14/910,466

(22) PCT Filed: Jul. 16, 2014

(86) PCT No.: PCT/EP2014/065310
§ 371 (c)(1),
(2) Date: Feb. 5, 2016

(87) PCT Pub. No.: WO2015/022137
PCT Pub. Date: Feb. 19, 2015

(65) Prior Publication Data
US 2016/0182199 A1    Jun. 23, 2016

(30) Foreign Application Priority Data
Aug. 14, 2013 (EP) .................................. 13180489

(51) Int. Cl.
*H04L 5/00* (2006.01)
(52) U.S. Cl.
CPC .......... *H04L 5/0044* (2013.01); *H04L 5/0051* (2013.01); *H04L 5/0053* (2013.01)
(58) Field of Classification Search
None
See application file for complete search history.

(56) References Cited

U.S. PATENT DOCUMENTS

| 2013/0230016 A1* | 9/2013 | Lindoff | H04W 74/006 370/330 |
| 2014/0056278 A1* | 2/2014 | Marinier | H04W 72/044 370/330 |

(Continued)

OTHER PUBLICATIONS

"3rd Generation Partnership Project; Technical Specification Group Radio Access Network; LTE; Evolved Universal Terrestrial Radio Access (E-UTRA); Physical Channels and Modulation (Release 11)", 3GPP Standard; 3GPP TS 36.211 version 11.3.0 Release 11, $3^{rd}$ Generation Partnership Project (3GPP), vol. RAN WG1, No. V11.3.0, (2013), XP050692824, 108 pages.

(Continued)

*Primary Examiner* — Mandish Randhawa
(74) *Attorney, Agent, or Firm* — Xsensus, LLP

(57) ABSTRACT

A communications device transmits/receives data to/from a mobile communications network including one or more network elements forming a wireless access interface for transmitting/receiving the data. An up-link includes a shared channel for transmitting the data to the mobile communications network. A controller controls a transmitter and receiver to transmit to the mobile communications network a request to transmit data in a smaller number of frequency division multiplexed symbols than available on the shared channel, to receive from the mobile communications network an indication of a sub-set of the predetermined number of frequency division multiplexed symbols in which the communications device should transmit the data on the shared channel, and to transmit signals representing the data in the shared channel to occupy a smaller number of frequency division multiplexed symbols than the number of the predetermined number of frequency division multiplexed symbols of the time period of the shared channel.

12 Claims, 13 Drawing Sheets

(56) References Cited

U.S. PATENT DOCUMENTS

| 2014/0286302 | A1* | 9/2014 | Khoryaev | H04W 28/24 370/330 |
| 2014/0313985 | A1* | 10/2014 | Nimbalker | H04L 27/0012 370/329 |
| 2015/0271791 | A1 | 9/2015 | Webb et al. | |
| 2015/0282155 | A1 | 10/2015 | Webb et al. | |

OTHER PUBLICATIONS

Sony: "Coverage enhancement by downlink power-density boosting for low-cost MTC UEs", 3GPP Draft; R1-130237, $3^{rd}$ Generation Partnership Project (3GPP), vol. RAN WG1. No. 72, Jan. 28-Feb. 1, 2013, XP050663373, 10 pages.

"3rd Generation Partnership Project; Technical Specification Group Radio Access Network, LTE; Evolved Universal Terrestrial Radio Access (E-UTRA); Physical layer procedures (Release 11)", 3GPP Standard; 3GPP TS 36.213, version 11.3.0 Release 11, $3^{rd}$, Generation Partnership Project (3GPP), vol. RAN WG1. No. V11.3.0. (Jul. 2013) ETSI TS 136 213 V11.3.0 176 ages, XP050692859.

Sierra Wireless: "PUSCH coverage improvement through limiting the number of sub-carriers per resource block". 3GPP TSG RAN WG1 #71, RI-125083 $3^{rd}$ Generation Partnership Project—(3GPP), vol. RAN WG1. Nov. 3, 2012 (Nov. 3, 2012). 4 pages, XP050662950.

Huawei, HiSilicon, "Coverage enhancement for physical channels and signals for low-cost MTC", 3GPP TSG RAN WG1 Meeting #72, RI-130017, $3^{rd}$ Generation Partnership Project (3GPP), Jan. 19, 2013 (Jan. 19, 2013), 10 pages, XP050663499.

Nokia Siemens Networks, "Considerations on PUCCH indexing scheme for LTE TDD", 3GPP TSG RAN WG1 #53bis R1-082602, $3^{rd}$ Generation Partnership Project (3GPP), Jun. 26, 2008 (Jun. 26, 2008), 4 pages XP050110856.

ETSI TS 136 211 V11.3.0 (Jul. 2013) LTE; Evolved Universal Terrestrial Radio Access (E-UTRA); Physical Channels and Modulation (3GPP TS 36.211 Version 11.3.0 Release 11), 110 pages.

ETSI TS 136 212 V11.3.0 (Jul. 2013) LTE; Evolved Universal Terrestrial Radio Access (E-UTRA); Multiplexing and channel coding (3GPP TS 36.212 version 11.3.0 Release 11), 86 pages.

ETSI TS 136 213 V11.3.0 (Jul. 2013) LTE; Evolved Universal Terrestrial Radio Access (E-UTRA); Physical layer Procedures, (3GPP TS 36.213 version 11.3.0 Release 11), 178 pages.

ETSI TS 136 331 V11.4.0 (Jul. 2013) LTE; Evolved Universal Terrestrial Radio Access (E-UTRA); Radio Resource control (RRC); Protocol Specification (3GPP TS 36 331 Version 11.4.0 Release 11), 350 pages.

Office Action dated Mar. 27, 2018, in Chinese Patent Application No. 2014800564341 (with English-language translation), 26 pgs.

* cited by examiner

DM-RS for PUSCH transmission timing within one slot in case of (a) normal cyclic prefix and (b) extended cyclic prefix operation.

Mapping of PUCCH formats to PUCCH regions m.

PUCCH format 1/1a/1b transmission and DM-RS, for normal cyclic-prefix operation. $r_0$ is a length-12 spreading code and $w_i$ are a Walsh-Hadamard sequence.

UE steps of flashbulb transmission.

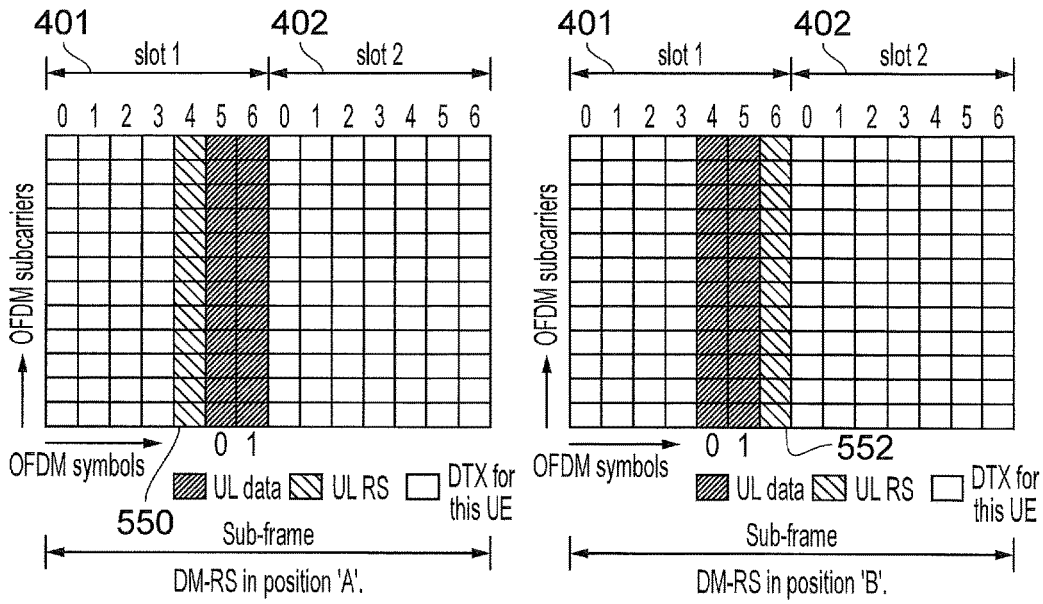
FIG. 10a — DM-RS in position 'A'.
FIG. 10b — DM-RS in position 'B'.
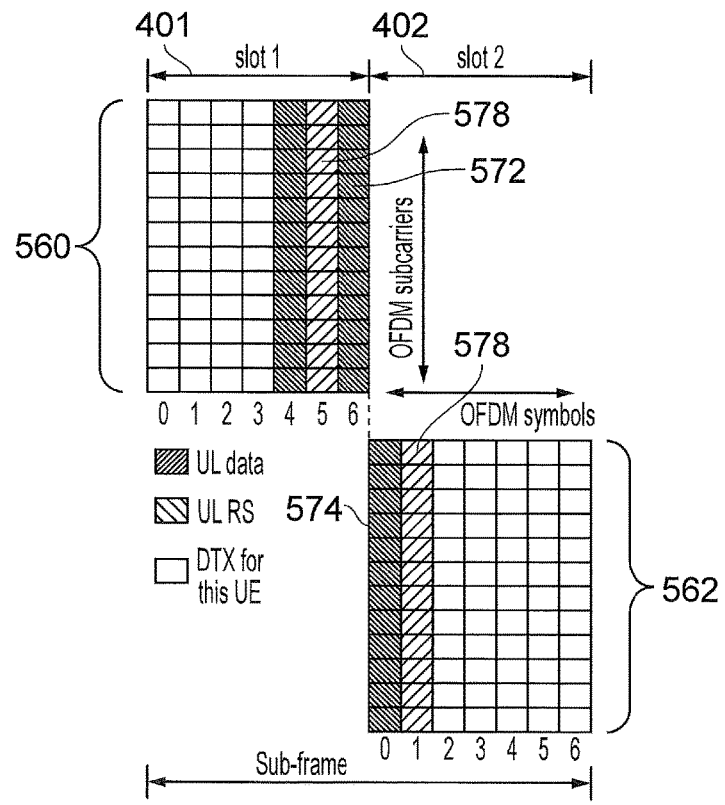
Example of flashbulb PUCCH distributed across two PRBs at opposite band edges and adhering to time domain contiguity.
FIG. 11

POWER DENSITY BOOSTING IN UPLINK SHARED CHANNELS

CROSS-REFERENCE TO RELATED APPLICATIONS

The present application is based on PCT filing PCT/EP2014/065310 filed Jul. 16, 2014, and claims priority to European Patent Application 13 180 489.0, filed in the European Patent Office on Aug. 14, 2013, the entire contents of each of which being incorporated herein by reference.

Thus as shown in FIGS. 8a and 8b, the UE can transmit a pair of data symbols in SC-FDMA symbols (3, 4, 5) or (4, 5, 6), which in one example can be interpreted as different information sets, which are called 'Set 1' and 'Set 2' respectively. Then the position-based modulation options are as depicted in Table 1 below, where a BPSK-based example has been used for simplicity of presentation but without loss of generality. This particular flashbulb arrangement is most relevant to PUCCH format 2/2a/2b which would use QPSK pairs instead of the BPSK pairs we have used here for clarity. So by way of example, in FIG. 8a, an eNodeB detecting nothing in SC-FDMA symbol 3, '0' in SC-FDMA symbol 4 and '1' in SC-FDMA symbol 6 concludes that the actual information data being conveyed is '101'. Upon detecting the transmission in FIG. 8b, the eNodeB concludes that the actual information data being conveyed is '001'.

TECHNICAL FIELD OF THE DISCLOSURE

The present disclosure relates communications devices, infrastructure equipment for mobile communications networks, mobile communications networks and systems and methods of transmitting and receiving data via mobile communications networks.

BACKGROUND OF THE DISCLOSURE

Mobile communications systems continue to be developed to provide wireless communications services to a greater variety of electronic devices. In more recent years, third and fourth generation mobile telecommunication systems, such as those based on the 3GPP defined UMTS and Long Term Evolution (LTE) architectures have been developed to support more sophisticated communications services to personal computing and communications devices than simple voice and messaging services offered by previous generations of mobile telecommunication systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

More recently it has been recognised that rather than providing high data rate communications services to certain types of electronics devices, it is also desirable to provide communications services to electronics devices that are simpler and less sophisticated. For example, so-called machine type communication (MTC) applications may be semi-autonomous or autonomous wireless communication devices which may communicate small amounts of data on a relatively infrequent basis. Some examples include so-called smart meters which, for example, are located in a customer's house and periodically transmit information back to a central MTC server data relating to the customer's consumption of a utility such as gas, water, electricity and so on. Other examples include applications to automotive technology and medical devices As will be appreciated it is desirable to provide arrangements for reducing power consumption and therefore increasing battery life of communications devices operating to communicate data via mobile communications networks.

SUMMARY OF THE DISCLOSURE

Embodiments of the present disclosure can provide in one example a communications device, which transmits data to or receives data from a mobile communications network. The mobile communications network includes one or more network elements which are arranged to form a wireless access interface for transmitting and receiving the data. The communications device comprises a transmitter unit configured to transmit signals representing the data on an up-link of the wireless access interface to the mobile communications network and a receiver unit configured to receive signals representing the data transmitted on a down-link from the mobile communications network via the wireless access interface. The wireless access interface provides a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols. The up-link includes a shared channel providing the communications resources for allocation to the communications device by the mobile communications network for transmitting the data on the up-link to the mobile communications network. The shared channel provides communications resources which are shared with other communications terminals and comprising in the time domain, the predetermined number of frequency division multiplexed symbols in each time period for allocation to the communications device. A controller is configured to control the transmitter unit to transmit the signals and the receiver unit to receive the signals to transmit or receive the data. The controller is configured to control the transmitter unit and the receiver unit to transmit to the mobile communications network a request to transmit data in a smaller number of frequency division multiplexed symbols than are available on the shared channel, to receive from the mobile communications network an indication of a sub-set of the predetermined number of frequency division multiplexed symbols in which the communications device should transmit the data on the shared channel, and to transmit signals representing the data in the shared channel to occupy a smaller number of frequency division multiplexed symbols than the number of the predetermined number of frequency division multiplexed symbols of the time period of the shared channel.

By reducing a number of frequency division multiplexed symbols on which the signalling information is transmitted in the control channel to be less than the predetermined number of symbols available on the shared channel, embodiments of the present disclosure can provide a corresponding reduction in power consumed by the communications device. Accordingly there is an improvement in the battery life of the communications device. The term frequency division multiplexed symbols is used to describe a time and frequency division multiplexing technique such as OFDM or SC-FDMA which modulates sub-carriers on the frequency domain and forms symbols from the modulated sub-carriers in the time domain.

In one example, the controller is configured to transmit the signals representing the signalling information in the smaller number of frequency division multiplexed symbols within the time period of the shared channel starting at a different one of the predetermined number of frequency division multiplexed symbols. Each of the different starting frequency division multiplexed symbols represents further information, which may in one example form part of the signalling information. Therefore by providing a variation in the starting position of the signals representing the signalling information in a smaller number of the predetermined number of frequency division multiplexed symbols the reduction in communications capacity provided by the reduction in the number of symbols can be compensated by increasing the data signalling capacity. This is achieved by varying the starting position of the transmission of the signalling information.

Embodiments of the present technique can also be applied to the transmission of data in a control channel of a mobile communications network. In one example there is provided a communications device for transmitting data to or receiving data from a mobile communications network. The mobile communications network includes one or more network elements which are arranged to form a wireless access interface for transmitting and receiving the data. The communications device comprises a transmitter unit configured to transmit signals representing the data on an up-link of the wireless access interface to the mobile communications network and a receiver unit configured to receive signals representing the data transmitted on a down-link from the mobile communications network via the wireless access interface. The wireless access interface provides a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols. The up-link includes a control channel for transmitting signalling information from the communications device to the mobile communications network in accordance with a predetermined format in which signals which representing the signalling information occupy, in the time domain, the predetermined number of frequency division multiplexed symbols of the control channel. A controller is configured to control the transmitter unit to transmit the signals and the receiver unit to receive the signals to transmit or receive the data. The controller is configured to adapt the transmission of the signals representing the signalling information transmitted, by the transmitter unit, in the control channel to occupy a smaller number of the predetermined number of frequency division multiplexed symbols of the time period of the control channel.

In some examples the communications devices are reduced capability devices such as MTC devices, such as smart meters or medical devices.

Various further aspects and embodiments of the disclosure are provided in the appended claims, including but not limited to, an infrastructure equipment (or network element of a mobile communications network), a communications device and method of communicating to a communications device using a mobile communications network element.

BRIEF DESCRIPTION OF DRAWINGS

Embodiments of the present disclosure will now be described by way of example only with reference to the accompanying drawings in which like parts are provided with corresponding reference numerals and in which:

FIG. 10a is a schematic illustration showing an arrangement for transmissions of signals within a time slot of a sub-frame in a reduced number of frequency division multiplexed symbols (SC-FDMA) symbols and in which a DM-RS symbol is transmitted in a first position A; FIG. 10b provides a corresponding schematic illustration showing an arrangement for transmission of signals in which the DM-RS symbol is in a second position B;

FIG. 11 is a schematic representation showing an example of an up-link control channel (PUCCH) transmission distributed across two physical resource blocks;

DESCRIPTION OF EXAMPLE EMBODIMENTS

Example Network

Figure 1:
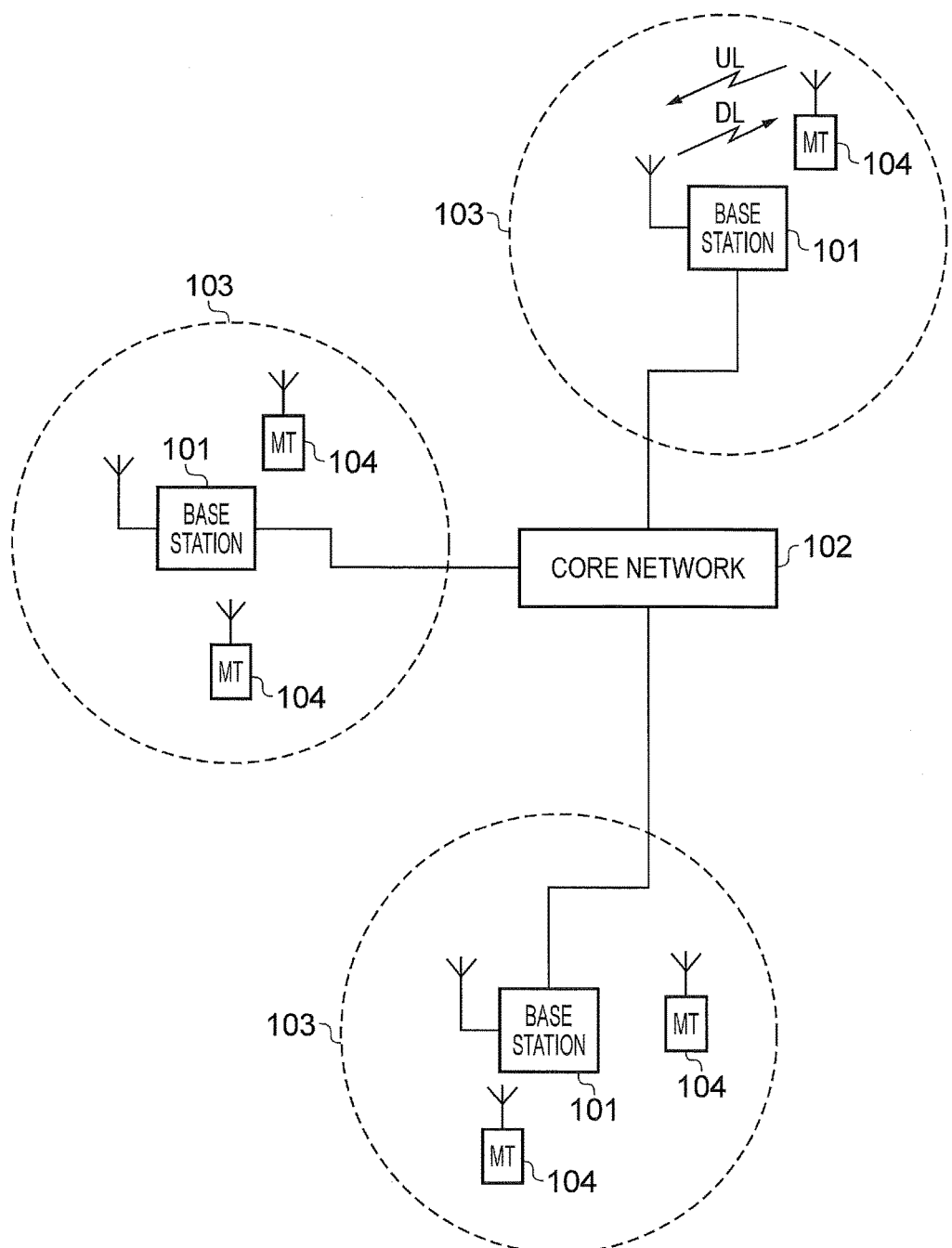
FIG. 1 provides a schematic diagram illustrating an example of a conventional mobile communications system.

FIG. 1 provides a schematic diagram illustrating the basic functionality of a conventional mobile communications system. In FIG. 1, a mobile communications network includes a plurality of base stations 101 connected to a core network 102. Each base station provides a coverage area 103 (i.e. a cell) within which data can be communicated to and from communications devices 104. Data is transmitted from a base station 101 to a communications device 104 within a coverage area 103 via a radio downlink Data is transmitted from a communications device 104 to a base station 101 via a radio uplink. The core network 102 routes the data to and from the base stations 104 and provides functions such as authentication, mobility management, charging and so on. The base stations 101 provide a wireless access interface comprising the radio uplink and the radio downlink for the communications devices and form examples of infrastructure equipment or network elements for the mobile communications network, and may be, for the example of LTE, an enhanced Node B (eNodeB Or eNB).

The term communications devices will be used to refer to a communications terminal or apparatus which can transmit or receive data via the mobile communications network. Other terms may also be used for communications devices such as personal computing apparatus, remote terminal, transceiver device or user equipment (UE) which may or may not be mobile.

Example Down-Link Configuration

Figure 2:
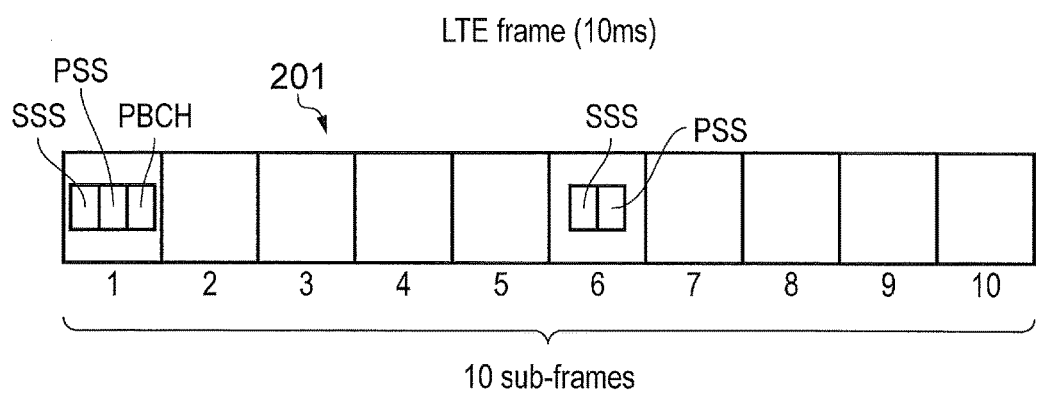
FIG. 2 provides a schematic diagram illustrating an arrangement of channels of a wireless access interface for ten down-link sub-frames of a conventional LTE wireless access interface.

Mobile telecommunications systems such as those arranged in accordance with the 3GPP defined Long Term Evolution (LTE) architecture use an orthogonal frequency division multiplexing (OFDM) based radio access interface for the radio downlink (so-called OFDMA) and the radio uplink (so-called SC-FDMA). Data is transmitted on the radio uplink and on the radio downlink on a plurality of orthogonal sub-carriers. FIG. 2 shows a schematic diagram illustrating an OFDM based LTE downlink radio frame 201. The LTE downlink radio frame is transmitted from an LTE base station and lasts 10 ms. The downlink radio frame comprises ten sub-frames, each sub-frame lasting 1 ms, and each sub-frame comprises two slots, each slot lasting 0.5 ms. A primary synchronisation signal (PSS) and a secondary synchronisation signal (SSS) are transmitted in the first and sixth sub-frames (conventionally numbered as sub-frame 0 and 5) of the LTE frame, in the case of frequency division duplex (FDD) system. A physical broadcast channel (PBCH) is transmitted in the first sub-frame of the LTE frame. The PSS, SSS and PBCH are discussed in more detail below.

Figure 3:
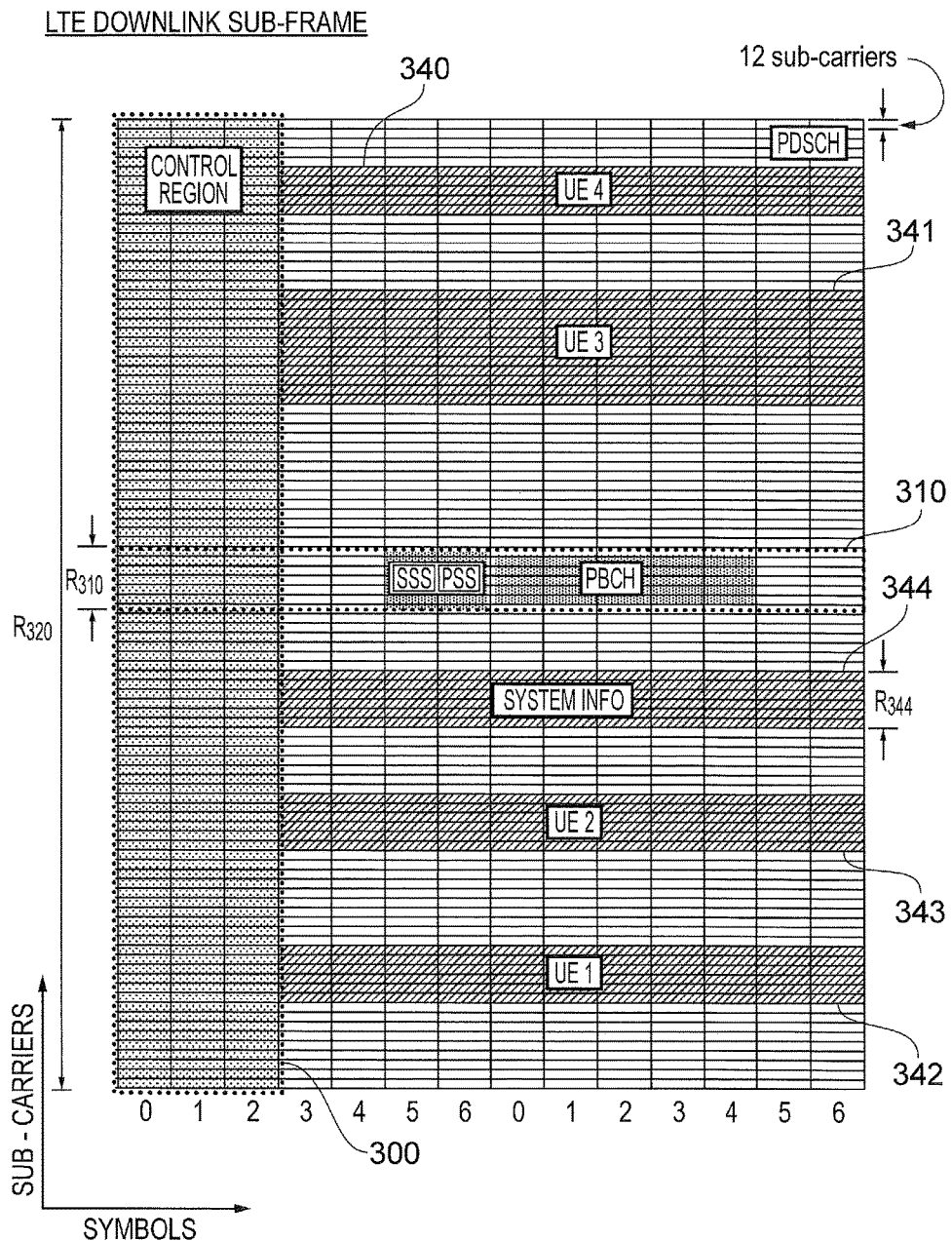
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one slot. For clarity, in FIG. 3, each individual resource element is not shown, but instead each individual box in the sub-frame grid corresponds to twelve sub-carriers transmitted on one symbol.

FIG. 3 shows resource allocations for four communications devices 340, 341, 342, 343. For example, the resource allocation 342 for a first communications device (UE 1) extends over five blocks of twelve sub-carriers, the resource allocation 343 for a second communications device (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific communications devices (UEs). Thus, the PDCCH data transmitted in the control region 300 of the sub-frame shown in FIG. 3 would indicate that UE1 has been allocated the first block of resources 342, that UE2 has been allocated the second block of resources 343, and so on. In sub-frames where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH) mentioned above. This central band 310 is typically 72 sub-carriers wide (corresponding to a transmission bandwidth of 1.08 MHz). The PSS and SSS are synchronisation sequences that once detected allow a communications device 104 to achieve frame synchronisation and determine the cell identity of the base station (eNodeB) transmitting the downlink signal. The PBCH carries information about the cell, comprising a master information block (MIB) that includes parameters that the communications devices require to access the cell. The data transmitted to individual communications devices on the physical downlink shared channel (PDSCH) can be transmitted in the remaining blocks of communications resource elements of the sub-frame.

FIG. 3 also shows a region of PDSCH containing system information and extending over a bandwidth of $R_{344}$. Thus in FIG. 3 the central frequency carries control channels such as the PSS, SSS and PBCH and therefore implies a minimum bandwidth of a receiver of a communications device.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, subcarriers carrying data transmitted on the PDCCH, PCFICH and PHICH are typically distributed across the entire bandwidth of the sub-frame. Therefore a conventional communications device must be able to receive the entire bandwidth of the sub-frame in order to receive and decode the control region.

Example Up-Link Configuration

PUSCH Structure

According to an example embodiment the up-link of a wireless access interface which operates in accordance with LTE is under the control of the eNodeB, which receives buffer status reports (BSR) from UEs to aid scheduling decisions. As with the down-link, the up-link includes a communications channel which provides shared resource known as a physical up-link shared channel (PUSCH) providing resources, which are granted in downlink control information (DCI) messages sent on PDCCH. Communications resources are granted to UEs on a resource block group (RBG) basis, where an RBG can contain two, three or five RBs. The grant of PUSCH resources are in contiguous frequency resources to allow transmission with a low cubic metric since this improves power amplifier efficiency. The exception to this is that, from LTE Rel-10, PUSCH may be granted in two separate 'clusters', with each cluster being individually in contiguous frequency resources. More details can be found relevant 3GPP specifications, for example TS 36.211, TS 36.212, TS 36.213 and TS 36.331.

The eNodeB can sound the uplink channel by configuring the UE to send a sounding reference signal (SRS), described below. If the bandwidth and quality of the SRS are sufficient, the eNodeB can use frequency-selective scheduling for PUSCH where the same resource blocks are typically used in both slots of a sub-frame. This is rational since the eNodeB has good knowledge of which resources are best for the UE across a wide bandwidth. Alternatively, if the SRS quality is not good enough (or no SRS are configured), then LTE supports frequency-diverse scheduling (also known as frequency non-selective scheduling). In this case, two frequency-hopping options are available to automatically exploit the frequency diversity of the channel:

Inter-sub-frame hopping where the resource allocation frequency hops between the re-transmissions of a HARQ process. This gives frequency diversity among the re-transmissions.

Intra- and inter-sub-frame hopping where the resource allocation frequency hops at the slot boundary and also between the re-transmissions of a HARQ process. This gives frequency diversity within a single transmission of a transport block as well as between the re-transmissions.

The hopping mode which is used is broadcast within the cell. In both cases, the hopping can be in a pre-determined pseudo-random pattern configured by the radio resource control (RRC) or via an explicit hopping offset signalled along with the Up-link resource grant on PDCCH.

Figure 4:
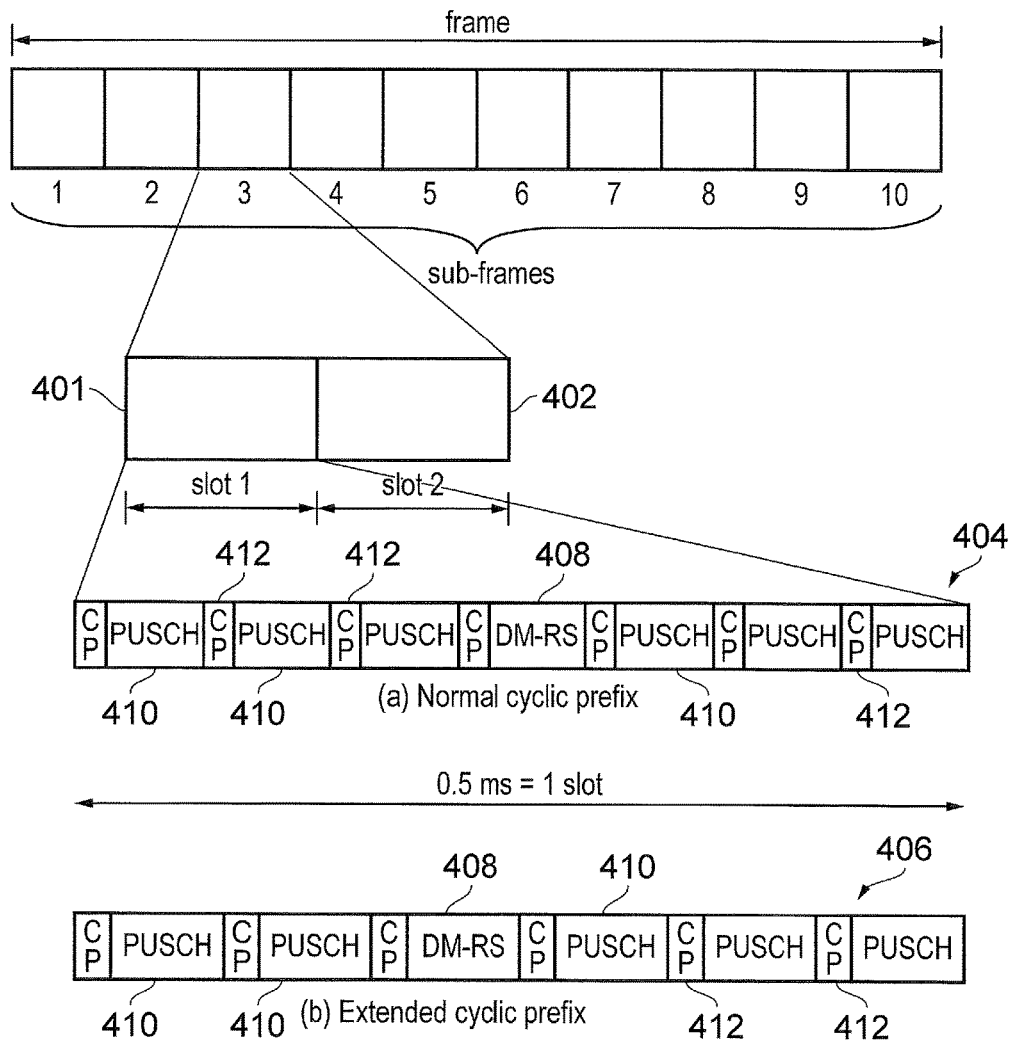
FIG. 4 provides a schematic illustration of an example arrangement for an uplink shared channel (PUSCH) with DM-RS symbols and normal or extended cyclic-prefix operation.

FIG. 4 provides an example representation of an uplink frame structure. As shown in FIG. 4, each frame of the uplink is comprised of 10 sub-frames in correspondence with the downlink Each of these sub-frames is comprised of two time slots 401, 402. Each slot is comprised of seven symbols in the time domain, and in the frequency domain each of the symbols provides a plurality of subcarriers which are assigned to the same UE. The resource blocks are assigned in the frequency domain on the basis of 12 sub-carriers so that a UE may be assigned N×12 subcarriers in the frequency domain. Typically, in accordance with a conventional operation, a UE is assigned all of the seven symbols in the time slot 401, 402. As shown in FIG. 4, two examples 404, 406 represent the symbols in each slot which include the PUSCH 408 which, as explained above provides shared physical channel for uplink resources and a modulation reference symbol (DM-RS) 410. Each of the symbols in the time slot includes a cyclic-prefix CP 412 which in correspondence with the principles of OFDM operation provides a repetition of the samples from the wanted channel in a guard period in order to allow for inter-symbol interference.

DM-RS for PUSCH

The demodulation of reference symbols (DM-RS) 410 for the PUSCH are transmitted only in RBs for which the PUSCH has been granted. They occur in every time slot 401, 402 and for normal cyclic prefix operation, DM-RS occupy the fourth SC-FDMA symbol as shown in the first example representation 404 while for extended cyclic prefix operation, as shown in the second example 406 they occupy the third SC-FDMA symbol, as illustrated in FIG. 4.

The sequence length for DM-RS is equal to the number of subcarriers allocated to PUSCH for this UE, and 12 cyclic time shifts are supported on a DM-RS SC-FDMA symbol to allow orthogonal multiplexing for e.g. multi-user MIMO. If a multi-clustered PUSCH is in use, a sequence of the length of the total number of allocated subcarriers is generated, and is split between the two clusters for transmission.

Figure 5:
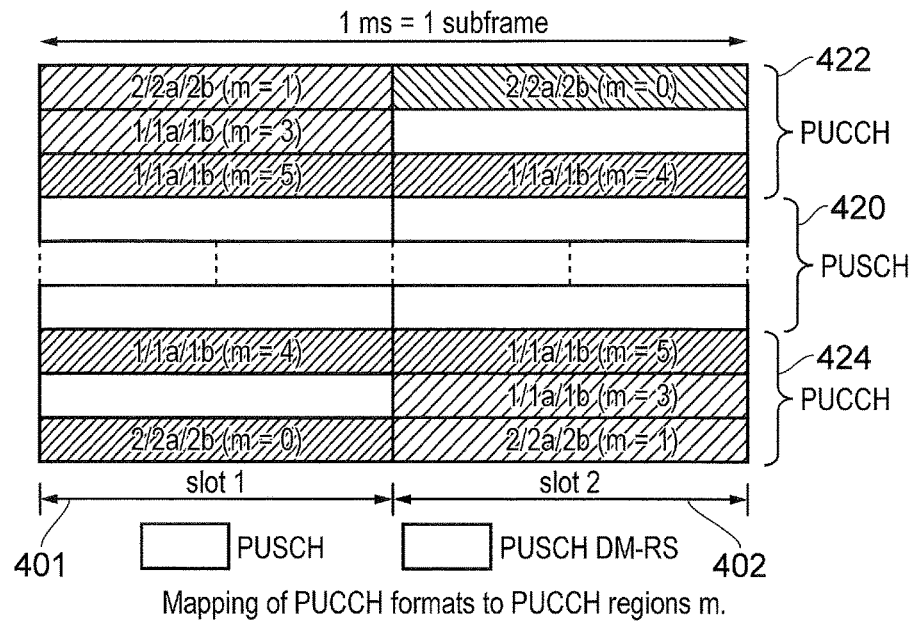
FIG. 5 is a schematic illustration of a sub-frame illustrating a position of uplink control channels, PUCCH, and an up-link shared channel, PUSCH within one sub-frame of an up-link.

FIG. 5 provides a representation of the structure of a sub-frame for the uplink in the frequency domain. As indicated above each sub-frame is comprised of two time slots 401, 402 within which there is transmitted seven symbols in the time domain and in the frequency domain each symbol is comprised of sub-carriers allocated to the same UE on the basis of N×12 subcarriers. However FIG. 5 is a simplified presentation of the up-link which does not shown the transmission of individual symbols, but shows an example implementation of an uplink control channel which for the example of LTE would be the physical uplink control channel (PUCCH).

PUCCH Structure

As shown in FIG. 5 resource blocks which are allocated to a UE from the shared physical channel PUSCH occupy a central portion of the frequency band 420 whereas the PUCCH is formed at the edges of the frequency band 422, 424. A PUCCH region is therefore two RBs, one in each slot of a sub-frame, which are positioned close to opposite ends of the system bandwidth. Precisely which RBs a PUCCH is allocated depends on the uplink control information (UCI) it is carrying (the so-called 'format' of the PUCCH) and on how many RBs the eNodeB allocates in total for PUCCH in a sub-frame Unlike the PUSCH and the PDSCH, for the example implementation of LTE, the resources for PUCCH are not signalled explicitly on PDCCH, but are instead signalled by RRC configuration combined, in some cases, with implicit information relating to the location of PDCCH. The RRC configuration itself is partly cell-specific and partly UE-specific, which parts depending on the format.

For the example of LTE networks, in Rel-8 and Rel-9, a UE never has PUSCH and PUCCH in the same sub-frame to preserve the low cubic-metric of the transmission. Therefore, when UCI is to be transmitted in a sub-frame where the UE is to have PUSCH, the UCI is multiplexed onto PUSCH and PUCCH is not sent. From Rel-10, simultaneous PUSCH and PUCCH can be configured.

As shown in FIG. 5, the PUCCH is comprised of different formats. The PUCCH formats convey UCI as follows:
- Format 1: Scheduling Request (SR)
- Format 1a: 1-bit HARQ ACK/NACK with or without SR
- Format 1b: 2-bit HARQ ACK/NACK with or without SR
- Format 2: CSI in 20 coded bits (with 1- or 2-bit HARQ ACK/NACK in extended CP)
- Format 2a: CSI and 1-bit HARQ ACK/NACK
- Format 2b: CSI and 2-bit HARQ ACK/NACK
- Format 3: Multiple ACK/NACKs for carrier aggregation with optional SR The order in which the various PUCCH formats are mapped to RBs in a sub-frame with multiple PUCCH formats is shown in FIG. 5, with 2/2a/2b at the band edge, followed by a mixed-format PUCCH (if present) and then 1/1a/1b. The number of PUCCH regions available for 2/2a/2b is broadcast in the cell.

The Format 3 is configured from among the PUCCH regions which may be allocated to format 2. The eNodeB scheduler ensures that the regions occupied by PUCCH formats 2/2a/2b and 3 do not overlap.

DM-RS for PUCCH

Figure 6:
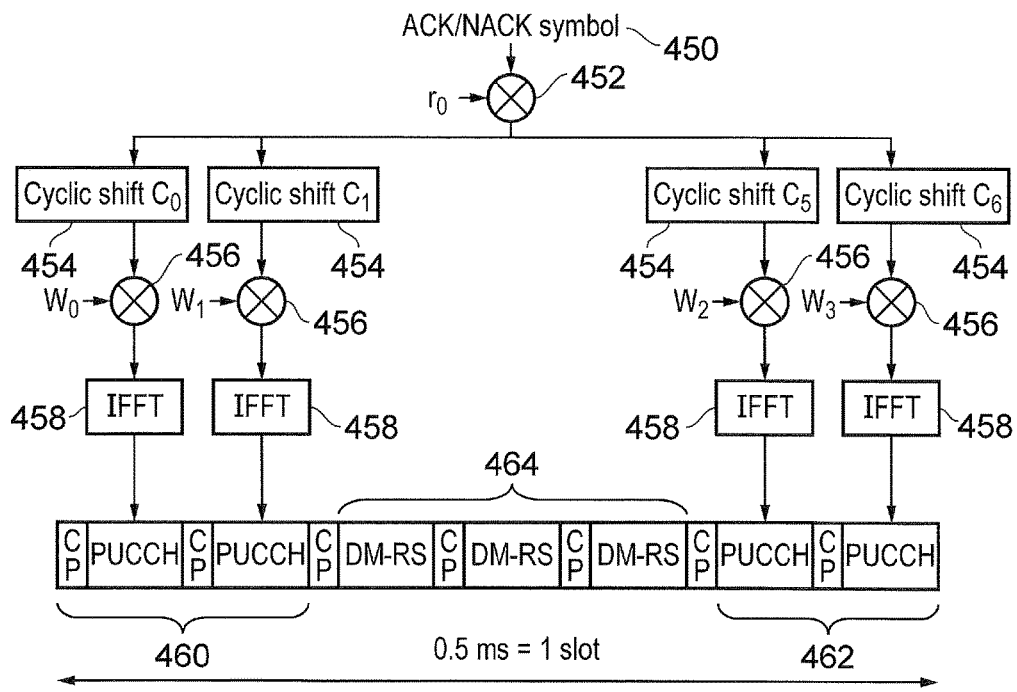
FIG. 6 is a schematic block diagram illustrating the formation of a PUCCH format 1/1a/1b.

The DM-RS are transmitted separately for the PUCCH and PUSCH. As for the PUSCH, they are transmitted only in RBs for which a UE has PUCCH configured, and they occur in every such slot. DM-RS occupy different SC-FDMA symbols depending on the PUCCH format. An example of such an arrangement is shown in FIG. 6, in which the transmission of format 1/1a/1b and its DM-RS for normal cyclic prefix operation is presented. As shown in FIG. 6 for example the PUCCH is arranged to transmit an ACK/NACK symbol to the eNodeB which is a typical example of control information transmitted by the UE on the PUCCH. The ACK/NACK symbol 450 is multiplied by a receiver spreading code r0 of length-12 by a multiplier 452 before the signal is fed to each of seven cyclic-prefix formers 454. The cyclic-shifters 454 serve to shift the samples of the ACK/NACK symbol using a Zadoff-Chu sequence. Each of the signals from the cyclic-shifters 454 are received by a multiplier 456 and multiplied by a coefficient of a Walsh-Hadamard sequence in order to spread the spectrum of the ACK/NACK symbol 450 within the time-slot 401, 402. The outputs from the multipliers 456 are fed to an inverse Fourier transformer (IFFT) 458 which convert the sub-carriers which are formed in the frequency domain for the symbol into the time domain and transmitted as a symbol of the PUCCH within the timeslot 401, 402. As shown in FIG. 6 the timeslot 401, 402 comprises four PUCCH symbols, two each at either end of the time-slot 460, 462 and a central portion 464 provides three DM-RS symbols. Therefore for this example, there are three symbols carrying DM-RS, and the time slot carrying the single ACK/NACK symbol 450 is repeated with cyclic time-shifts and a Walsh-Hadamard code on the remaining SC-FDMA symbols. The UE is therefore able to code division multiplex the transmission of the ACK/NACK symbol 450 using the cyclic shifts and Walsh-Hadamard codes. Therefore each UE sending PUCCH format 1/1a/1b in the same PUCCH region uses a different combination of Walsh-Hadamard code and cyclic shifts of a base Zadoff-Chu sequence.

Figure 7:
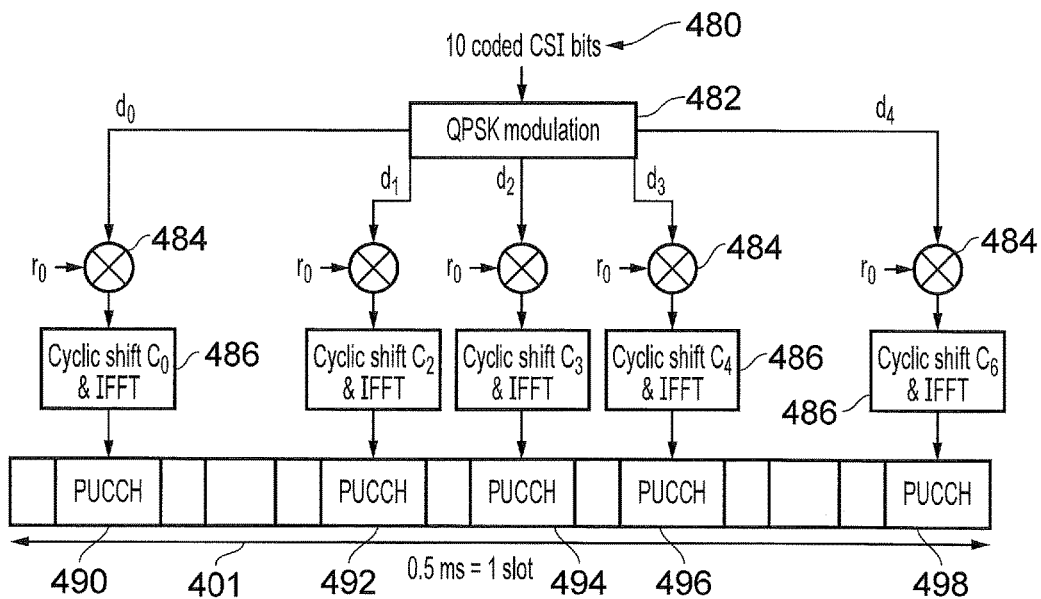
FIG. 7 is a schematic block diagram illustrating an arrangement for forming a PUCCH format 2/2a/2b.

A further example of the PUCCH in format 2 is shown in FIG. 7. FIG. 7 provides an example in which channel state information (CSI) is a further example of control information which is transmitted in the PUCCH. The CSI comprises ten coded bits 480, which are fed to a QPSK modulator 482, which serves to form the ten coded CSI bits into five QPSK symbols. Thus format 2 uses QPSK modulation which carry two bits per modulation symbol. The QPSK modulator 482 forms five QPSK symbols d0, d1, d2, d3 and d4 for transmission on five PUCCH symbols 490, 492, 494, 496, 498. Each of the five QPSK symbols are fed to a multiplier 484 which multiplies each of the five QPSK symbols by a length 12 spreading code, such as the Walsh-Hadamard sequence as for the above example. The output from multipliers 484 are fed to a cyclic-shifter and an inverse Fourier transformer (IFFT) 486, which serve to cyclically shift the spread spectrum QPSK symbols by a cyclic shift code and form the SC-FDMA symbols in the time domain by performing an inverse Fourier transform. Thus each of the five PUCCH symbols 490, 492, 494, 496, 498 are formed into the time domain and transmitted with two DM-RS symbols 499, 500. As shown in FIG. 7, three of the PUCCH symbols form a central part of the timeslot 401 and two are transmitted at each end of the timeslot with the DM-RS symbols 499, 500 interposed between the three semper central PUCCH symbols and the two edge PUCCH symbols.

For the example transmission of format 2/2a/2b illustrated in FIG. 7, it is necessary to carry more control information (UCI data), so there are fewer RS and the coded CSI is QPSK modulated before being spread symbol-wise onto the remaining SC-FDMA symbols. Therefore a UE multiplexes the control information with other UEs in format 2 using the cyclic shifts, in which each UE sending PUCCH format 2/2a/2b in the same PUCCH region uses a different set of cyclic shifts of a base Zadoff-Chu sequence.

For the further example of Format 3, which is used to transmit control information, this format provides for transmitting the same time-domain pattern as format 2/2a/2b. The baseband processing is a hybrid of formats 1 and 2 with the addition of phase shifts on the repetitions, and it is not based on Zadoff-Chu sequences. It is not set out in detail here since it is not used in the example embodiments of the invention.

SRS Structure

The sounding reference signal (SRS) can be configured by the eNodeB to allow sounding of the Up-link channel in order to facilitate, e.g., frequency-selective scheduling. SRS can be configured across any bandwidth, but since a UE is typically power limited, it may be that only a limited bandwidth can be sounded with sufficient quality in one transmission. The full details of SRS configuration are not described in detail here. However the salient points are:
- SRS are always transmitted in the final SC-FDMA symbol of a sub-frame in which a UE is configured to send them.
- SRS can be configured on a periodic basis, or they can be triggered by eNodeB.
- There is a cell-specific RRC configuration amounting to telling all UEs the sub-frames in which periodic SRS may occur from any UE in the cell. No UE sends PUSCH or PUCCH in the relevant SC-FDMA symbols.
- There is a UE-specific RRC configuration of the periodic sub-frame pattern the UE shall send SRS according to, as well as other relevant items such as their bandwidth, frequency-domain position and a hopping configuration.

According to the example embodiment of LTE, the PUSCH/PUCCH and SRS are never transmitted simultaneously. The PUCCH format 2/2a/2b takes priority over a simultaneously-configured SRS transmission. The PUCCH format 1a/1b can be configured to take priority over simultaneously-configured SRS, or its transmission can be shortened by one SC-FDMA symbol with consequential alterations to the PUCCH construction. The PUSCH is rate-matched around the RBs containing SRS.

Energy Storage in Terminal Devices

Today, wireless terminals without a fixed power supply store their energy in a battery/ies. Batteries are good for energy storage, because they are slow to discharge, typically being designed to supply a reasonably constant current for a long period. They cannot usually provide sudden bursts of current. But to drive a power amplifier (PA) to high power outputs, such a burst of current is needed nevertheless. Simple battery storage is therefore not ideal when better performance of a terminal could be obtained by transmitting with a much shorter duration than usual at correspondingly higher power density. To allow the wireless terminal transmitter to provide a burst of power, a capacitor, or capacitor-like technique, can be inserted between the battery and the power amplifier. Such a capacitor, or capacitor-like technique, can have a charge/discharge characteristic which is controllable and amenable to rapidly releasing a large proportion of its energy (at high current), before recharging from the battery.

Many wireless terminals are battery powered. This can be true whether they are mobile, such as smartphones, or reduced capability terminals such as for example mobile or fixed reduced capability devices such as smart meters. The intensive signal processing and potentially high transmit powers required to operate these devices in accordance with modern wireless standards such as LTE can result in a short battery life. For smartphones and similar devices, this can mean that frequent re-charge cycles are needed which can limit the appeal to the end user or limit the extent to which the capabilities of the device can be fully exploited. For some smart meters and similar devices, such as those conducting machine-type communications (MTC), battery life may approximately equate to device life, because it has been proposed that MTC devices are to be installed in inaccessible locations and it can be expensive for a utility company, for example, which owns the meter to replace the device or its battery.

These problems can be alleviated by technical improvements that reduce terminal transmission power consumption at the physical layer and, among such improvements, those with a small impact on data rate are of particular interest. One of the simplest methods to reduce power consumption is merely to turn off the terminal's transmit hardware for a greater proportion of the time. But this is not desirable in general, since it will reduce the ability of the terminal to communicate. A further problem, of particular pertinence to the smart-meter MTC terminal scenario is coverage. MTC devices may be installed in places such as deep residential basements from where it is hard for conventional LTE radio transmissions to reliably reach the eNodeB. This can result in high transmit power and/or re-transmissions to reach required performance levels, both of which are disadvantageous to battery life. Therefore, in such cases, it is desirable instead of reducing total transmit power, to keep the transmission power constant and concentrated into a shorter transmission duration, resulting in a higher received power-density at the eNodeB which can translate into higher reliability on the uplink.

Flashbulb Principle

According to the present technique a UE is restricted to only a few tens of microseconds of transmission per sub-frame, which is referred to in the following description as a 'flashbulb' transmission, but the precise temporal location and duration of transmission can be controlled by a controller controlling the UE transmitter. A particularly relevant way of enabling this kind of transmission is to store energy, which is accumulated by a UE's transmitter from a power source or a battery over a period of time and to release the energy in a burst, rather as if the power source charges a capacitor which is discharged quickly as has been explained above. According to the present technique an amount of time for which a terminal is required to transmit to send a certain number of bits is reduced, resulting in a more efficient use of radio resource and power efficient operation of the uplink According to some embodiments for the example application to LTE, the transmission of the control information on an uplink control channel such as the PUCCH is used to convey further information or form part of the control information. This can be achieved for example by the steps that (i) the SC-FDMA symbol at which the transmission begins; and/or (ii) the location of reference signal(s) transmissions within the overall transmission and (iii) which of a predefined set of possible reference symbol sequences is used by the UE are used at the eNodeB as additional states to interpret the modulated symbols contained in REs covered by the transmission. It is assumed that, since the decoding of the Up-link occurs at the eNodeB, processing power and time is not a significant constraint.

Example embodiments of the present technique will now be described with reference to the example of an LTE network with application to the PUCCH and PUSCH and their respective associated DM-RS. According to some example embodiments one or more of the following aspects may characterise the operation of a communications device (UE):

Transmission from a flashbulb-capable UE is always in contiguous SC-FDMA symbols.

A UE transmitter can be controlled to position a burst of transmission accurately to begin in any SC-FDMA symbol of a given sub-frame and further to control the duration of the burst of transmission to as little as one SC-FDMA symbol.

Transmission should preserve the single-carrier nature of the LTE Up-link as per Rel-11.

Existing Up-link physical channels and signals should all be supported to some degree, but can be re-designed where needed.

Transmission of Flashbulb UE in PUCCH

As explained above, embodiments of the present technique can provide an arrangement in which a UE can reduce its power consumption by reducing its transmission time for transmitting a predetermined message in a first time period which is shorter than a second time period, which has been allocated for the transmission of that information by a conventional UE. A system which has been configured to transmit specific information in the second time period, whereas according to the present technique the UE is adapted to transmit the information in a shorter first time period, which is less than the second allocated time period. A communications device (UE) operating in this way is referred to as a 'flashbulb UE'. One example application will now be described with reference to the transmission of control information by a Flashbulb UE in the PUCCH of an LTE based wireless access interface. As explained above with reference to FIG. 5, the PUCCH is one physical resource block (PRB) wide in each slot of a sub frame, and positioned at opposite edges of the bandwidth 422, 424 in the two slots 401, 402. The precise arrangement of data and DM-RS onto the SC-FDMA symbols of a PRB varies between the PUCCH formats as explained above.

In one example embodiment, the UE is given a configuration by the eNodeB that it can send control information on the PUCCH of a given duration within a time-domain resource that is longer than the configured duration, thus giving the UE the choice of where to position its transmission. That is to say that the transmission time of the signals representing the control information is shorter than the temporal length of the PUCCH provided by the wireless access interface, and therefore the Flashbulb UE has a choice of where to position the transmission. The position in the time domain serves to convey further information to the eNodeB or conveys part of the control information and in one form can be to index a higher-order modulation scheme based on the lower-order data carried on the SC-FDMA symbols themselves.

Figures 8A, 8B:
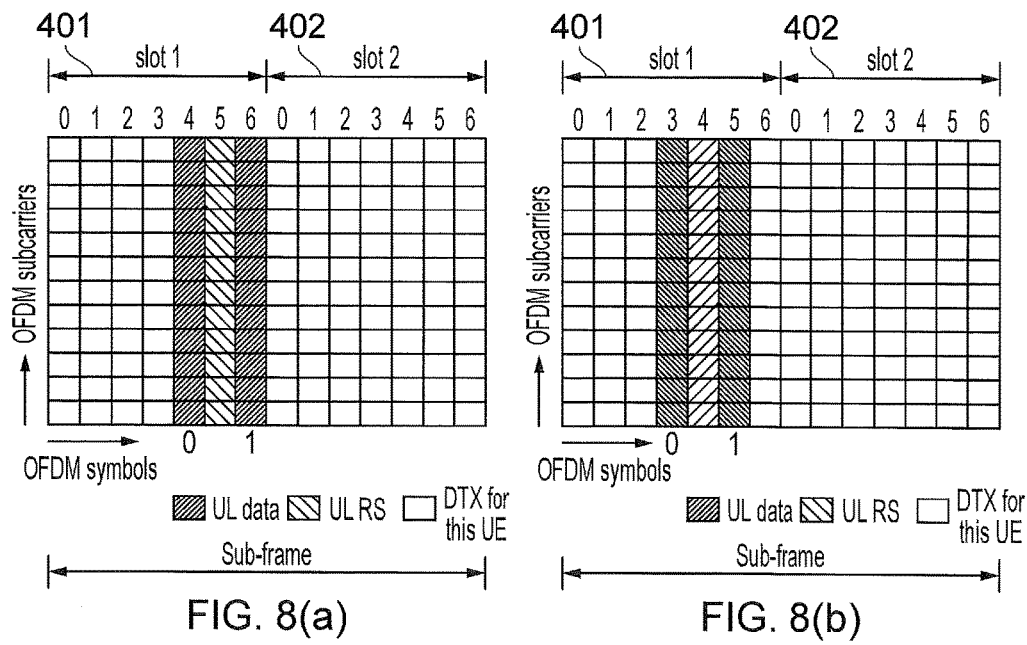
FIG. 8a is a schematic illustration of a transmission of signals within a control channel in accordance with one example of the present technique.
FIG. 8b is a schematic illustration of the transmission of signals within a control channel in accordance with another example of the present technique.

One example illustration is shown in FIGS. 8a and 8b. FIGS. 8a and 8b provide an illustration of the resource elements which form the resource blocks of the PUCCH within a sub-frame. As explained above, the sub-frame comprises two time-slots 401, 402. As shown in FIGS. 8a and 8b the example of the PUCCH shown provides seven OFDM symbols per time slot 401, 402, which are number 0 to 6. Each symbol comprises a block of 12 OFDM subcarriers in the frequency domain. This corresponds to a conventional arrangement explained above with reference to FIGS. 5, 6 and 7. A conventional UE would transmit control information in all of the seven symbols and the 12 subcarriers of the timeslot and in both timeslots 401, 402, as explained above. According to present technique however a flashbulb UE is configured to transmit on only three of the seven OFDM symbols across the OFDM subcarriers and furthermore the three symbols whilst being contiguous in time can vary in position thus conveying further information to the eNodeB. In some examples transmission only occurs in one of the timeslots and not the other. Thus as shown in FIG. 8a the control information is transmitted only on symbols numbered 4, 5 and 6 in FIG. 8a and symbols numbered 5, 6 and 7 in FIG. 8b. Accordingly, the position of the transmission by the flashbulb UE conveys further information, which may form part of the control information as explained below. Therefore the example illustration shown in FIGS. 8a and 8b which illustrates a PUCCH comprising of a single resource block the Flashbulb UE has the following configuration:

Width of transmission=3 symbols
Transmission to be confined within symbols numbered 3 to 6 inclusive
DM-RS for PUCCH to occupy one symbol

CROSS-REFERENCE TO RELATED APPLICATIONS

The present application is based on PCT filing PCT/EP2014/065310 filed Jul. 16, 2014, and claims priority to European Patent Application 13 180 489.0, filed in the European Patent Office on Aug. 14, 2013, the entire contents of each of which being incorporated herein by reference.

Thus as shown in FIGS. 8a and 8b, the UE can transmit a pair of data symbols in SC-FDMA symbols (3, 4, 5) or (4, 5, 6), which in one example can be interpreted as different information sets, which are called 'Set 1' and 'Set 2' respectively. Then the position-based modulation options are as depicted in Table 1 below, where a BPSK-based example has been used for simplicity of presentation but without loss of generality. This particular flashbulb arrangement is most relevant to PUCCH format 2/2a/2b which would use QPSK pairs instead of the BPSK pairs we have used here for clarity. So by way of example, in FIG. 8a, an eNodeB detecting nothing in SC-FDMA symbol 3, '0' in SC-FDMA symbol 4 and '1' in SC-FDMA symbol 6 concludes that the actual information data being conveyed is '101'. Upon detecting the transmission in FIG. 8b, the eNodeB concludes that the actual information data being conveyed is '001'.

TABLE 1

|  | Binary pair | | | |
|---|---|---|---|---|
|  | 0, 0 | 0, 1 | 1, 0 | 1, 1 |
| Set 1 grouped symbol | 000 | 001 | 010 | 011 |
| Set 2 grouped symbol | 100 | 101 | 110 | 111 |

Figure 9:
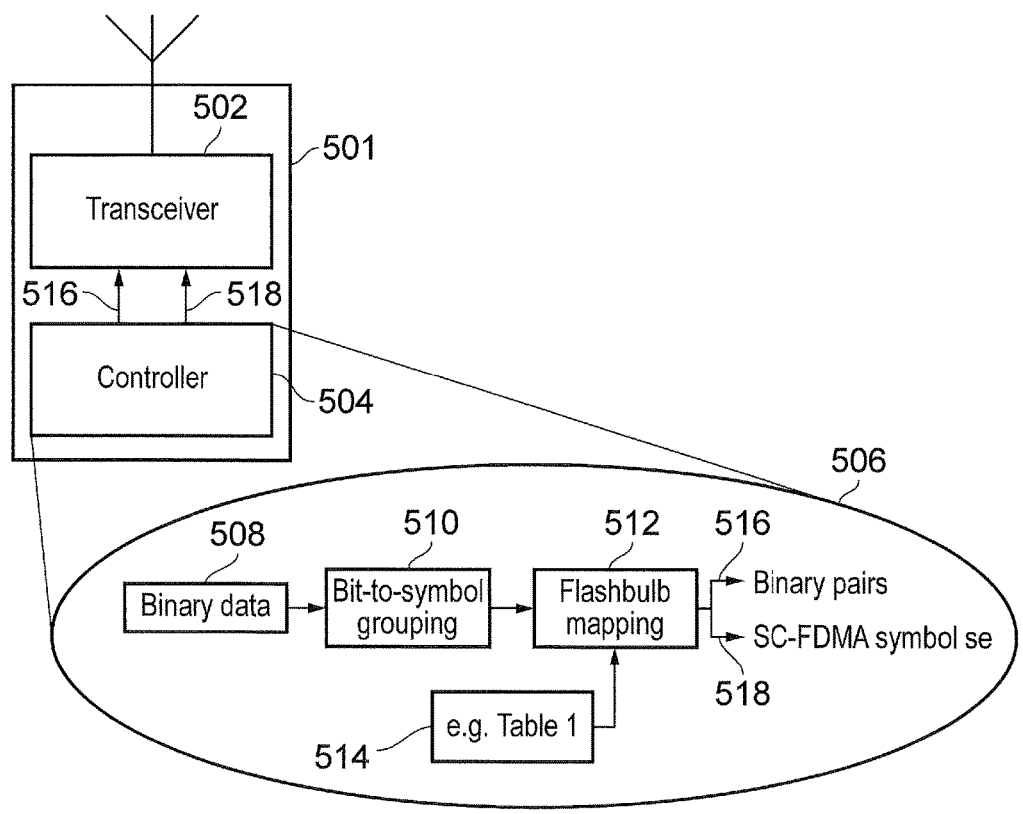
FIG. 9 is a part schematic block diagram part flow diagram illustrating operations performed by a controller to generate signal transmissions in accordance with the present technique.

An example of a UE operating in accordance with the present technique is shown in FIG. 9. In FIG. 9 a flashbulb UE 501 includes a transceiver unit 502 and a controller 504. A transceiver unit 52 contains a transmitter and receiver adapted to transmit and receive signals via the wireless access interface provided by the mobile communications network. The controller controls the transceiver to transmit and receive the data which is then fed to or received from a higher layer application which is not shown. However what is relevant to the illustration of the present technique is the operation of a controller which is presented in the form of a flow diagram as operation steps within the controller 504 within a bubble 506. As shown in FIG. 5 binary data which is representing the control information is generated as a first step 508 which is then fed to a bit to symbol grouping 510 in order to transmit the binary data on the modulation symbols which have been adapted to represent the control information in accordance with the present technique. The modulation symbols are then received at a flashbulb mapping step 510 which is configured to map the modulation symbols onto the frequency division multiplexed symbols and subcarriers of the PUCCH channel in accordance with the information to be conveyed. The mapping of the modulation symbols onto the selected frequency division multiplexed sub carriers is determined in accordance with a table providing the allowable mapping of the frequency division multiplexed symbols and providing an indication of the information which that conveys. For example a data store 514 provides a representation of the mapping information identified in table 1. Accordingly the flashbulb mapping step 512 generates an indication of a binary pair on an output 516 and the frequency division multiplexed symbol set 518 which are fed to the transceiver unit 502 on corresponding outputs 516, 518 as shown within the flashbulb UE 501. Therefore as illustrated in FIG. 9 a binary data stream is grouped into sets of 'grouped' symbols of the relevant size by step 510. For example 3 bits (similar to 8-PSK) in Table 1, are used to determine whether ' Set 1' or 'Set 2' of the SC-FDMA symbols should be used, and which binary pair should be transmitted as output at step 516 and the two data-carrying symbols of step 518.

As a result of the arrangement shown in FIG. 9, three bits can be transmitted by signalling only two, equivalent to transmitting an 8-PSK signal using BPSK. However, three SC-FDMA symbols have been used for the purpose and four symbols are reserved although the fourth symbol uses no transmit power. Accordingly in comparison to a conventional UE, fewer SC-FDMA symbols and therefore less transmit power is used, than would conventionally have been needed since, to transmit a hypothetical three 'grouped' symbols in current PUCCH 2/2a/2b structures would require at least four symbols including DM-RS.

More symbol sets could be created to increase the number of states that can be transmitted. For example the next power of two would require a set of five symbols to be reserved for this example transmission, so that there are four possible sets of contiguous symbols to choose from.

The mapping in Table 1 would have a bit error rate (BER) resulting from potentially incorrect detection at the eNodeB of the received control information. Gray coding is a known technique for minimising a bit error rate by positioning modulated symbols with bit changes close together. According to one example a Gray code mapping of the information from Table 1 could be as shown below in table 2, where only one bit in a group of bits which forms a modulated symbol changes between adjacent binary pairs within a set and only one bit in a modulated symbol changes between each symbol set within a binary pair.

TABLE 2

A Gray mapping relevant to Table 1.

| | Binary pair | | | |
|---|---|---|---|---|
| | 0, 0 | 0, 1 | 1, 1 | 1, 0 |
| Set 1 grouped symbol | 000 | 001 | 011 | 010 |
| Set 2 grouped symbol | 100 | 101 | 111 | 110 |

Vary Position of DM-RS

In another example embodiment the controller 504 of the Flashbulb UE is arranged to vary the position of the DM-RS symbol as part of the transmission provided that three symbols are still time-contiguous. In the example, in which one DM-RS is transmitted as any of the three symbols contained wholly within either of 'Set 1' or 'Set 2', according to which set has been chosen for data transmission, a total of twenty four states can be transmitted using two binary bits. Since twenty four is not an integer power of two, it may be sufficient to define only two permissible positions for the DM-RS symbol within each set of SC-FDMA symbols, resulting in sixteen states equivalent to four bits. This is illustrated in FIGS. 10*a* and 10*b* where the BPSK pair of modulation symbols are being transmitted, which are represented as 0, 1 and corresponds to the example configuration of FIGS. 8*a* and 8*b*. Thus FIGS. 10*a* and 10*b* provide a representation of the transmission of BPSK symbols within a first timeslot 140 of a sub-frame. In contrast to the example shown in FIGS. 8*a* and 8*b*, the uplink transmission of DM-RS symbol varies from a first position 552 in FIG. 10*a* to a second position of 552 in FIG. 10*b*. For the example shown in FIGS. 10*a* and 10*b*, the modulation symbols both indicate the same value of 0 and 1. However by changing the position of the DM-RS symbol additional information can be signalled.

Thus as illustrated in FIGS. 10*a* and 10*b* the first and second modulation symbols transmitted are 0 and 1. A mapping of the combination of SC-FDMA symbol set and DM-RS positions from binary pair to quaternary symbols is shown in Table 3. This table could also be Gray mapped in various ways following the example of Table 2. Table 3 below provides an indication of the possible signalling information being transmitted on a control channel. The eNodeB then detects whether the DM-RS symbol is in position 'A', that is shown in FIG. 10*a* or in a position 'B' that is shown in FIG. 10*b*. If the transmitted DM-RS symbol is in position 'A', then the second column indicates that the control information could be either '0001' or '0101' depending on whether the frequency division multiplexed symbols were transmitted as set one or set two. For the examples shown in FIGS. 10*a* and 10*b* the signals were transmitted in frequency division multiplexed symbols 4, 5 and 6 and therefore correspond to set two. Accordingly, FIG. 10*a* represents a transmission of signalling information '0101' whereas the transmitted signals represented in FIG. 10*b* represents signalling information '1101'. As can be appreciated therefore by changing the position of the DM-RS reference symbols, further information can be signalled without requiring any increase in the modulation level or transmission of more frequency division multiplexed symbols thereby shortening the transmission by the Flashbulb UE.

It could be preferable in cases where not all possible DM-RS locations are permitted, such as in this example, to separate the permitted positions as widely as possible in time in order to reduce mis-detection probability among DM-RS symbol positions, which is illustrated in FIGS. 10*a* and 10*b*.

TABLE 3

| | DM-RS in position 'A' | | | | DM-RS in position 'B' | | | |
|---|---|---|---|---|---|---|---|---|
| Binary pair | 0, 0 | 0, 1 | 1, 0 | 1, 1 | 0, 0 | 0, 1 | 1, 0 | 1, 1 |
| Set 1 grouped symbol | 0000 | 0001 | 0010 | 0011 | 1000 | 1001 | 1010 | 1011 |
| Set 2 grouped symbol | 0100 | 0101 | 0110 | 0111 | 1100 | 1101 | 1110 | 1111 |

A further increase to the efficiency of transmission of control information can be achieved by using more than one sequence for generating the DM-RS. If either of two possible sequences can be used, then following the sixteen-state example presented above on FIG. 3 can be used to create thirty two signalling states, which is equivalent to 5 bits.

An example of a reduction in power consumption resulting which can be achieved using the above described embodiments can be considered using a PUCCH format 2/2a/2b, where, within one slot, five QPSK symbols and two DM-RS symbols are sent, requiring seven SC-FDMA symbols in total. In the example given above, by replacing the BPSK pairs with QPSK pairs, only three SC-FDMA symbols are required thus reducing the power consumed by approximately 57%. An alternative embodiment provides an arrangement in which the Flashbulb UE does not reduce its total transmission power consumption but instead concentrates its power into the much-reduced time duration of the transmission, so increasing the power density with which it will be received by the eNodeB, thereby improving the Up-link coverage in the cell. Any mixture of the two is clearly also beneficial compared to known methods.

Use of Physical Resource Blocks (PRB)

In the example embodiments presented above, the transmission of the signals carrying the control information is within the first time slot 401 of the sub-frame. However the transmission could equally be arranged in the second time slot 402. Furthermore a conventional operation provides a UE with PUCCH resource at opposite band edges in the two slots 401, 402 of a sub-frame. In accordance with some example embodiments the Flashbulb UE is required to transmit signals representing the control information across different frequency bands in the first and second time slots 401, 402. However the break in transmission would imply that the UE used symbols not contiguous with the end of the first slot, for example as shown in FIG. 8a. This would violate the time-domain contiguousness requirement. Therefore, in some embodiments the physical resource block (PRB) at the opposite band edge in the second slot 402 is granted to a second 'Flashbulb' UE which would be configured similarly to, but independently of, the first UE in the first time slot 401. Similarly, the second PRB in the first time slot 401 could be granted to a third Flashbulb UE, and the second PRB in the second time slot 402 to a fourth Flashbulb UE. This would be a different scheduling arrangement than that depicted for current PUCCH in FIG. 5. Therefore in some embodiments the resources provided by the PUCCH can be used by more than one Flashbulb UE, so that the resources are more completely utilised.

In an alternative example embodiment, in order to maintain some of the frequency diversity of the existing PUCCH design for at least one UE, the UE can be granted resources in contiguous SC-FDMA symbols but split across the two time slots and across the two band edges at the slot boundary. This is illustrated in FIG. 11. In FIG. 11, the transmission of flashbulb UE extends across the first timeslot 401 and the second is timeslot 402. As illustrated in FIG. 11 the transmission occurs in frequency division multiplexed symbols numbered 4 to 9. In accordance with this example the transmission is split across the first frequency band 560 and a second frequency band 562 which in accordance with the example illustrated in FIG. 5 is split at either edge of the allocated up-link frequency band. As shown in FIG. 11 three of the frequency division multiplexed symbols 570, 572, 574 are allocated for transmitting frequency division modulation symbols whereas symbols numbered 5 and 8 are allocated for transmitting DM-RS symbols 576, 578. For the example illustrated in FIG. 11 the flashbulb UE would be configured as follows:

Width of transmission=5 symbols
Transmission to be confined within symbols numbered 4 to 9 inclusive
DM-RS for PUCCH to occupy one symbol in each slot were PUCCH is sent To show the extent of this case, the transmission is shown as containing three data symbols and two DM-RS symbols. The UE is allowed to vary the distribution of the PUCCH transmission between the two slots: in this particular example it has a reservation of three symbols in each slot. DM-RS will be needed in each slot since the transmissions in the two slots are widely separated in the frequency domain. In general, a UE might not use any of its granted resources in one of the slots.

As will be appreciated a combination of the example embodiment illustrated in FIG. 11 can be combined with the other example embodiments disclosed in FIGS. 8 to 10.

PUCCH Format 1a and 1b

In PUCCH format 1a and 1b, one or two information bits carrying ACK/NACK are sent respectively in BPSK or QPSK modulated symbols. In existing LTE, the ACK/NACK bit is sent on (up to) four SC-FDMA symbols per slot using what amounts to repetition coding, with DM-RS on the remaining three SC-FDMA symbols. This generally results in a lower signal to noise ratio operating point than for format 2/2a/2b.

According to example embodiments some of the possible states of the signal transmission can be created to be assigned to ACK and some states to NACK. This means that even in the presence of incorrectly determining the transmitted state, the information bit is still decoded correctly. The principle of Gray coding could again be useful here so that logically adjacent states map to the same information bit. In the example of Table 2, one possible Gray code mapping is shown, realised on the assumption that the most common error is within a binary pair being mis-detected in the wrong frequency division multiplexed (SC-FDMA) symbol set, which for ACK/NACK is presented in table 4.

TABLE 4

| | Binary pair | | | |
|---|---|---|---|---|
| | 0, 0 | 0, 1 | 1, 1 | 1, 0 |
| Set 1 grouped symbol | ACK | ACK | NACK | NACK |
| Set 2 grouped symbol | ACK | ACK | NACK | NACK |

A Gray code mapping realised on the basis that the most common error is within a frequency division multiplexed (SC-FDMA) symbol set where the binary pair is mis-detected could be as shown in table 5:

TABLE 5

| | Binary pair | | | |
|---|---|---|---|---|
| | 0, 0 | 0, 1 | 1, 1 | 1, 0 |
| Set 1 grouped symbol | ACK | ACK | ACK | ACK |
| Set 2 grouped symbol | NACK | NACK | NACK | NACK |

Similar mappings can be developed for the method also using DM-RS timing illustrated by FIGS. 10a and 10b and Table 3. This example is for PUCCH format 1a; QPSK pairs would be used for format 1b. An advantage is provided for this embodiment whereby transmission is robust to decoding errors at the eNodeB but still uses less transmission power than the conventional LTE scheme, as it uses only three SC-FDMA symbols rather than the seven in a timeslot (or fourteen in a sub-frame).

UE Time Multiplexing

As explained above, according to some example embodiments, the resources of the PUCCH which are not used by a flashbulb UE are allocated to another flashbulb UE so that the available resources can be time multiplexed between a plurality of UEs. Clearly as shown in the above examples, not all resource elements in the PRB illustrated above are being used. The unused resource elements could be assigned to one or more other UEs, who would have a correspondingly different configuration to the Flashbulb UE used in the example. Continuing the above example, within the one PRB, a second UE would be able to have three-symbols reserved in SC-FDMA symbols (0, 1, 2), within which one possible configuration is to transmit one data symbol and one DM-RS symbol (i.e. two SC-FDMA symbols in total) time-contiguously and the other example embodiments as explained above. This UE would have a lower Up-link data rate than the first UE if both operated otherwise identically.

Therefore as will be appreciated from the above discussion, embodiments of the present technique can provide an arrangement in which a plurality of flashbulb UEs are multiplexed within a one PRB. In contrast in other embodiments flashbulb transmissions could be multiplexed from a plurality of UEs in a number of different PRBs.

Since PUCCH allows code multiplexing of UEs in the same resource elements, in some embodiments UEs can be given overlapping flashbulb reservations and these reservations can overlap in all, or only some, of their SC-FDMA symbols.

Transmission of Flashbulb UE in PUSCH

On conventional PUSCH, one modulated symbol is sent independently on each resource element of a granted PRB. This arrangement contrasts with the PUCCH where one modulated symbol is sent with frequency spreading across all 12 resource elements in a SC-FDMA symbol. Even with this constraint, in some embodiments a mobile communications network can be arranged to provide a facility for transmitting data on the shared channel of the wireless access interface, which for LTE is the PUSCH, whilst conforming to the flashbulb transmission principles. In this example, data is transmitted by a UE in a smaller number of frequency division multiplexed symbols than are provided in each time slot of a PUSCH. However in contrast to the transmissions on PUSCH in known systems, the transmission on the PUSCH according to the invention are such that the REs are no longer independent over the time domain.

Figure 12:
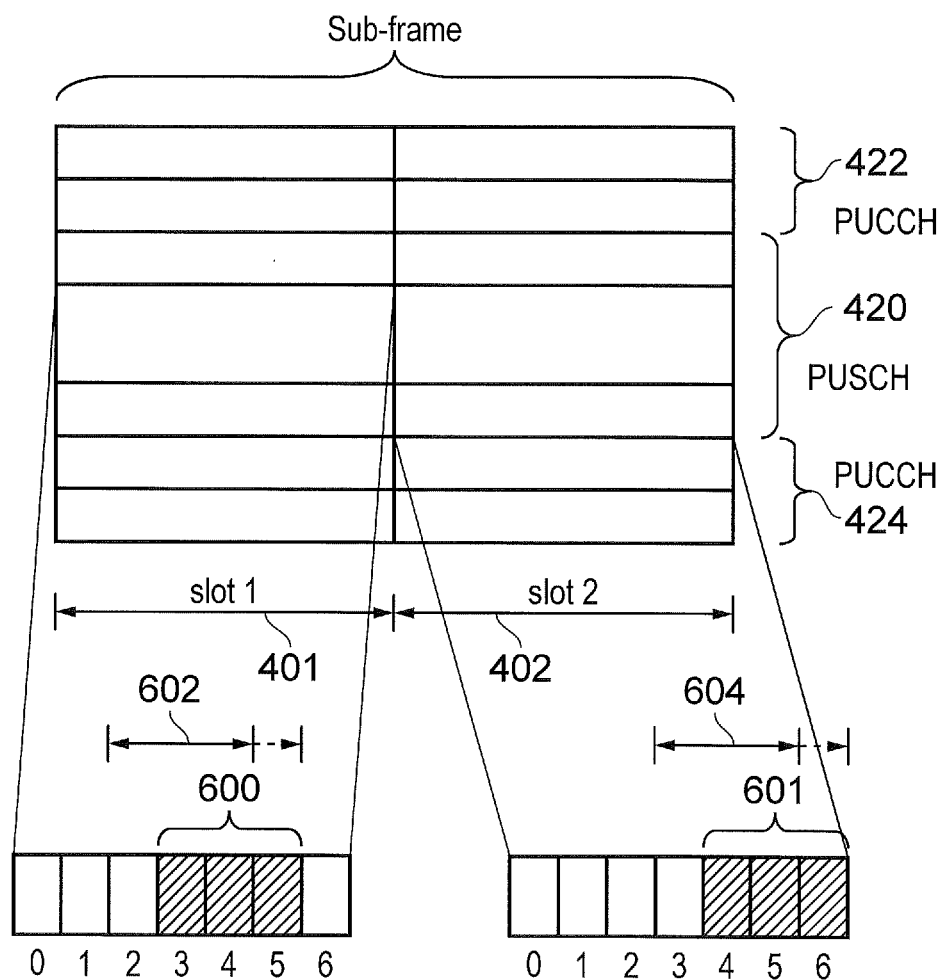
FIG. 12 is a schematic representation of a sub-frame in which transmissions of signals representing data in an uplink shared channel (PUSCH) is varied within a smaller number of frequency division multiplexed (SC-FDMA) symbols in accordance with the present technique.

An example illustration is shown in FIG. 12. In FIG. 12 which reflects the up-link frame structure shown in FIG. 5, two timeslots are shown 401, 402 of the up-link sub-frame which have been allocated for transmission to a UE. However in accordance with the present technique if the UE is a reduced capability UE or operating as a Flashbulb UE then as will be explained below the eNodeB has been adapted to allow the UE to transmit data in a smaller number of the frequency division multiplexed (SC-FDMA) symbols in each of the time slots in order to reduce a transmission time and therefore power consumed in accordance with the flashbulb UE principles outlined above. Thus as shown in FIG. 12 the hashed symbols 600, which are numbered 3, 4 and 5 of the seven symbols of the first time slot 401 represents a transmission of the flashbulb UE 600 whereas in the second time slot the symbols number 4, 5 and 6 of the seven available SC-FDMA symbols are used to transmit the data 601 by the Flashbulb UE.

As will be appreciated all of the embodiments of the present technique which have been described with reference to the PUCCH explained above can be applied to the PUSCH. Accordingly as indicated by an arrow 602, 604 the position of the transmissions in the reduced number of SC-FDMA symbols can vary in position in order to provide additional information or to convey part of the data which is transmitted to the eNodeB by the Flashbulb UE.

Figure 13A:
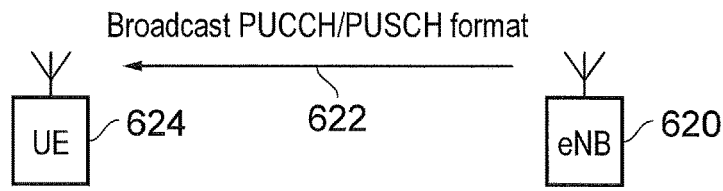
FIG. 13a is a part schematic block diagram part flow diagram illustrating the transmission of permitted reduced timeslot formats within the PUSCH using a broadcast channel.
Figure 13B:
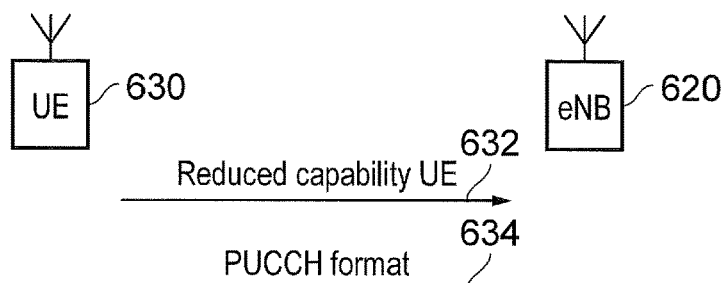
FIG. 13b is a part schematic part flow diagram illustrating an arrangement in which a reduced capability device indicates to the eNodeB its desire to transmit signals representing data in a shared channel using a smaller number of frequency division multiplexed (SC-FDMA) symbols than are available.
Figure 13C:
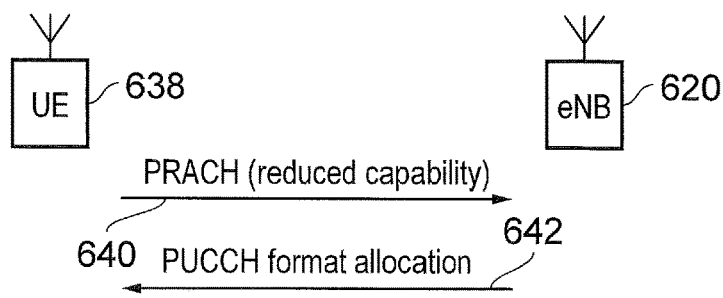
FIG. 13c is a part schematic block diagram part flow diagram illustrating a further example arrangement in which a PRACH is used to signal a smaller number of frequency division multiplexed symbols which can be used by a communications device to transmit data on the shared channel.

As indicated above in order for the mobile communications network to allow a UE to perform the Flashbulb technique in which only some of the seven symbols of a time slot of the sub-frame are used then the eNodeB needs to be configured to receive the data transmitted on a smaller number of SC-FDMA symbols. FIGS. 13a, 13b, 13c, and 13c provide example embodiments in which a signalling exchange between a reduced capability UE and an eNodeB is performed in order to provide an arrangement for transmitting data in a smaller number of the SC-FDMA symbols which are available in a time slot 401, 402. In FIG. 13a the eNodeB 620 transmits a broadcast message 622 to the UE 624 within the cell indicating the PUCCH transmission format which can be used by a flashbulb type UE to transmit data in a smaller number of SC-FDMA symbols that are available within each slot. In other embodiments eNodeB 620 provides transmission formats for flashbulb techniques for the PUSCH. Thus in the present example of FIG. 13a once the PUCCH/PUSCH transmission formats for flashbulb UEs have been transmitted in the cell then any UE which is requested and granted resources on the PUSCH and/or PUCCH will transmit data in a smaller number of SC-FDMA symbols than are available in each slot.

Figure 13D:
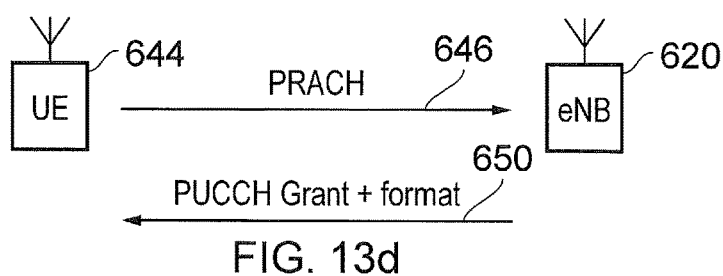
FIG. 13d is a corresponding part schematic part flow diagram illustrating a conventional transmission on a PRACH followed by the grant of a communications resource with an indication of the format which can be used to transmit signals in a smaller number of frequency division multiplexed (SC-FDMA) symbols than are available.

In contrast in FIG. 13b a UE 630 transmits as part of a set up procedure, which establishes a context, an indication that it is a reduced capability UE using a message 632. The eNodeB responds by providing the transmission format indicating the symbols of the timeslot which can be used for transmitting data on the shared channel 634. An alternative in FIG. 13c represents an arrangement in which the UE 638 transmits a PRACH 640 by which it is indicated that the UE 638 is a reduced capability UE. In other words, the UE 638 is indicating that it wishes to use the flashbulb principles in which data is transmitted in a smaller number of SC-FDMA symbols. In response the eNodeB 620 grants resources on the PUSCH and/or PUCCH and indicates in the resource grant 642 that the UE should use a certain number of the SC-FDMA symbols which is less than the predetermined number of symbols of the timeslot for transmitting data. Finally in FIG. 13d a UE 640 transmits a conventional PRACH transmission 646 to the eNodeB 620. In the example shown in FIG. 13d the eNodeB 620 and the UE 644 have already established that the UE 644 is a flashbulb type UE or reduced capability device and accordingly when the grant of resources on the PUSCH and/or PUCCH is transmitted on a message 650 there is indicated the SC-FDMA symbols which the UE should use to transmit data on the PUSCH.

According to examples shown in FIGS. 13a, 13b, 13c, 13d an arrangement is provided for identifying the symbols of each of the timeslots in which a UE can transmit data on the shared channel thus implementing the principles explained above for the PUCCH on the shared channel PUSCH, although the principles can also be applied to the PUCCH. Using this arrangement, the UE is given a configuration including a reservation of a subset of the SC-FDMA symbols within a PRB. Then, separately on each frequency-domain subcarrier, the time-contiguous resource elements within the PUSCH reservation can be used jointly to transmit a modulated symbol in the manner shown in, e.g. Table 2. For this example, there is no particular restriction to BPSK pairs, and any permitted modulation scheme could be used, e.g. 64-QAM. Thus, the UE can transmit any pattern of information bits (of a suitable length) on each frequency subcarrier. There could be a reduction in the peak PUSCH data-rate that could be achieved, but according to the example embodiment in which power conservation is a significant requirement, it may well also be the case that the UE's typical data rate is low and the peak rate is not of primary concern.

In essence, applying the present technique to the PUSCH demonstrates that there is no particular insistence that the transmission be across all subcarriers of an SC-FDMA symbol, in contrast to the frequency-domain spreading that is used on PUCCH.

PRACH

Of the existing LTE PRACH formats according to Release 11 of 3GPP specifications, format 4 already fits flashbulb operations, since its duration is only two SC-FDMA symbols, but it is restricted to use only in TDD modes. This format can therefore be used with the example shown in FIGS. 13b and 13c. Existing specifications could be relaxed to allow PRACH format 4 to be used by FDD UEs as well as TDD UEs as long as an FDD UE is operating in flashbulb mode. This would be aided by allowing FDD systems to configure more than one PRACH resource in a PRACH opportunity so that flashbulb and legacy UEs need not interfere in this respect. Signalling of this would need to be added in the cell broadcast information (currently in SIB2). A UE capable of operation in either conventional or flashbulb mode could be left with a choice of the manner and resources in which it access PRACH, or the cell could further broadcast instructions, or specifications could contain instructions, regarding what such UEs must do. If the UE has the choice, then the eNodeB can use the manner of PRACH access to determine the flashbulb capability (or, at least, a preference) of a UE, reducing the need for later RRC message exchanges for the purpose. Other possibilities, where the basic principles may be already known to the art, include predefining certain among the random access preambles as to be selected among by UEs wishing to indicate flashbulb operation and the rest for UEs operating conventionally.

Alternatively, a UE could operate in conventional LTE mode during initial cell acquisition procedures, including PRACH transmissions, and then move to, or be configured by eNodeB into, flashbulb operation once an RRC connection has been established.

Transmission of Sounding Reference Signal (SRS)

In a conventional LTE network, SRS can occupy the final SC-FDMA symbol of a sub-frame, so that the eNodeB can use the channel estimate reliably in the next sub-frame. The sub-frames and frequency resources in which a UE sends SRS are controlled by the eNodeB, but can extend across essentially any bandwidth if the UE has sufficient transmit power. In sub-frames where a UE is sending PUCCH and/or PUSCH, those transmissions are shortened by one SC-FDMA symbol if SRS are also present. There are two cases with respect to Flashbulb operation:

The UE has only SRS in this sub-frame. The UE effectively operates in flashbulb mode in conventional systems; or The UE has flashbulb PUCCH and/or PUSCH as well as SRS in this sub-frame. The time-contiguity requirement of flashbulb operation is not met in general.

In some example embodiments a flashbulb UEs may have only intermittent data to transmit and so it may be preferable to rely on a triggered SRS, available from Rel-10 LTE, so that the UE sends SRS at the very end of one sub-frame and flashbulb PUCCH/PUSCH can then be scheduled efficiently. In a similar way, an eNodeB scheduler behaviour could be to configure UEs from which it is expecting SRS in a given sub-frame to have flashbulb reservations that are contiguous with the final SC-FDMA symbol of the sub-frame. This would amount to the UE having no choice of the SC-FDMA symbols in which they must transmit, but it would still be able to position DM-RS for PUCCH/PUSCH as shown in FIGS. 10a and 10b and Table 3.

In summary existing SRS and flashbulb PUCCH/PUSCH operation can co-exist given suitable eNodeB scheduling behaviour.

According to the embodiments identified above, a communications device, which may be an MTC type device operating as Flashbulb UE can significantly reduce its power consumption because the controller of the transceiver unit transmits signals representing the data in a subset of SC-FDMA symbols of a PRB which are available to it. In one example given above, power consumption is reduced by 57% without reducing the number of bits transferred per PRB. Alternatively, the power consumption could be maintained but concentrated into the reduced resources occupied by flashbulb operation, thus increasing the Up-link coverage in the cell. This in turn would tend to reduce the need for re-transmissions from UEs as well as the downlink signalling from the eNodeB to trigger and control them. These two advantages can be mutually traded-off against one another to achieve any mix of power-consumption reduction and coverage extension that a device manufacturer desires.

If more than one UE is multiplexed into a PRB, then the capacity of the transmission channel can allow one or more other UEs to have Up-link resources per sub-frame.

General eNodeB Decoding

In order to decode a flashbulb transmission, the eNodeB according to one implementation would have to search blindly over the possible transmissions that a UE could have made. This will tend to increase the decoding time and processing effort at the eNodeB, but significantly greater amounts of both are available there than at the UE. A mis-decoding at the eNodeB of a flashbulb transmission could trigger the same procedures as in conventional LTE.

Flashbulb Resource Grants

The resource grants and reservations for flashbulb Up-link transmission would need to include the conventional information regarding which PRBs a UE is granted as well as which SC-FDMA symbols it can assume are reserved for it. These reservations could be;

Included in the grant on PDCCH by expanding the contents of, or creating new, DCI messages;

Configured semi-statically by RRC per UE;

Broadcast in the cell as a function of, e.g. UE identity for those cases where UEs can be multiplexed into the same REs.

Accordingly embodiments of the present technique can be used to request and receive resource grants in a way which is backwardly compatible with conventional UEs and LTE networks since a non-flashbulb UE can be granted PRBs that are distinct from PRBs assigned to flashbulb UEs.

UE Modes

A given UE might be able to operate in conventional LTE mode as well as flashbulb mode depending on its power consumption requirements at a given time. Such a UE could signal to the eNodeB that it wishes to move to/from conventional to flashbulb operation by, e.g., asserting/releasing a flag at RRC. A simpler UE might only be able to indicate that it can operate in flashbulb mode, but not be able to indicate a wish to change mode. In either case, if the eNodeB decides to put a UE into flashbulb operation, it can indicate as much either in a PDCCH message on a per-sub-frame basis or semi-statically at RRC. In general, then, a suitably-capable UE might be instructed to move to and from flashbulb operation on a per-sub-frame basis or at any time.

MTC Up-Link Transmissions

Depending on the physical implementation of the flashbulb operation of a UE, it may be that there is a delay between individual flashbulb transmissions. As such, embodiments of the present technique can provide an advantage for MTC UEs where Up-link transmissions can tend to be small and occasional. Although the capacitor-like UE energy storage mentioned above provides an example of performing the Flashbulb like transmission, embodiments of the present technique are not limited to this method of implementing the Flashbulb transmission and other techniques are possible.

Example embodiments of the present technique can therefore provide the following advantages:

A UE receives an Up-link resource reservation, and is not directed by eNodeB as to which part of it is used for transmission, whereas at present an Up-link grant is used in its entirety with rate-matching as necessary.

The timing of the start of a transmission conveys part of the information being sent in the transmission, whereas the UE presently has no time-domain freedom from the eNodeB grant/configuration for PUSCH/PUCCH.

The timing of the transmission of RS associated with PUSCH/PUCCH conveys part of the information being sent in the transmission, whereas this is not the case at present.

For PUCCH format 1/1a/1b in particular, the transmission of HARQ ACK/NACK in any of multiple states provides a robust transmission without using the existing LTE technique (which is essentially time-domain repetition).

For PUSCH in particular, the joint transmission of data over several SC-FDMA symbols within one frequency sub-carrier is different to current operation, where each RE is entirely independent.

For PRACH in particular, a UE capable of both conventional and flashbulb operation is able to communicate this at an early stage of operation by its choice of resources for and manner of PRACH transmission.

The eNodeB has a new capability to alter the mode of operation of a UE between conventional and flashbulb operation according to any of (i) the UE's capability; (ii) the UE's preference among its capabilities; (iii) the eNodeB's preference. As a result, the mode of operation of a UE can be a hybrid of conventional LTE and flashbulb LTE, in any particular time-domain pattern per sub-frame.

Example Mobile Communications System

Figure 14:
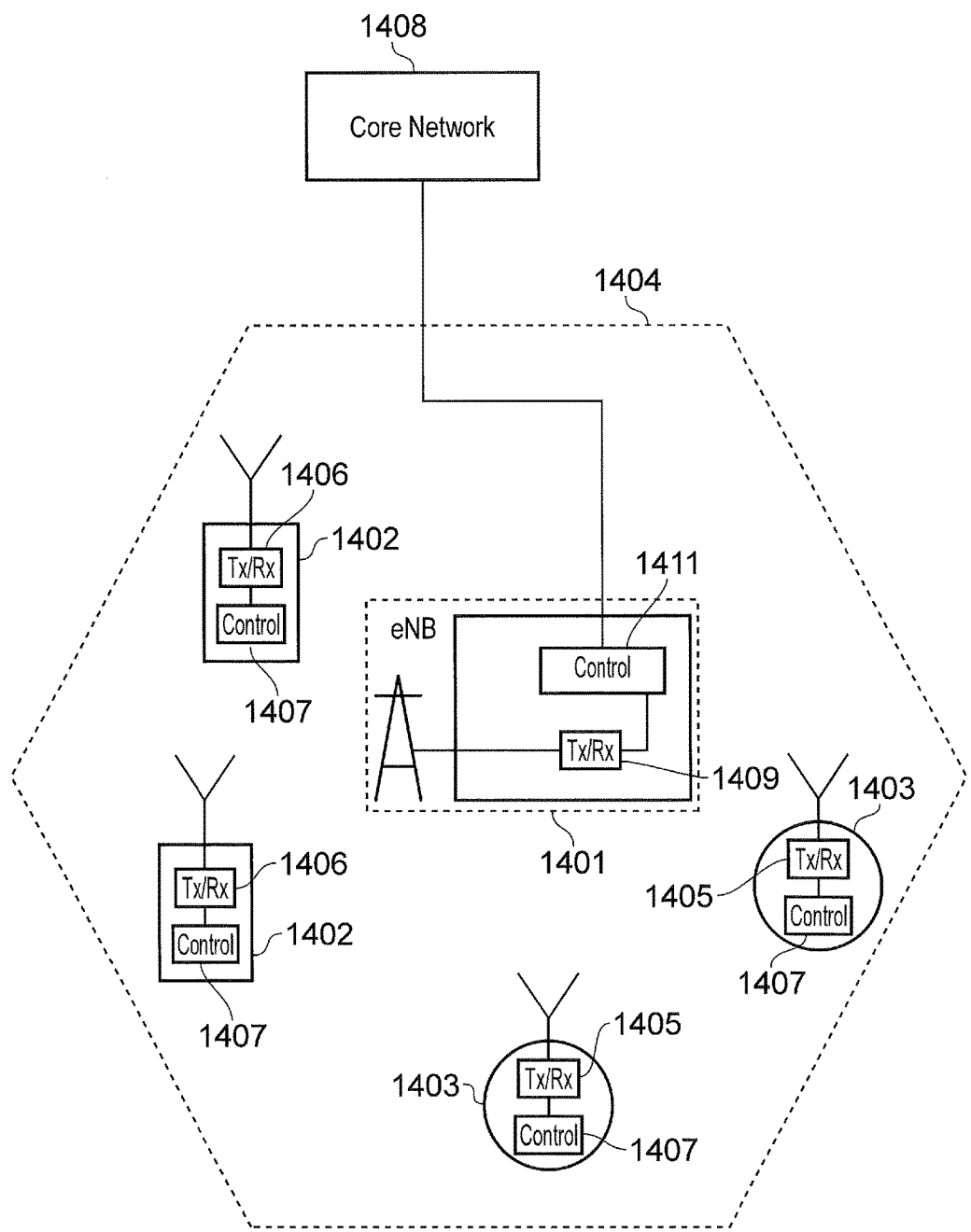
FIG. 14 is a schematic block diagram of an example mobile communications system according to an example embodiment of the present technique.

FIG. 14 provides a schematic diagram showing part of an adapted LTE mobile communications system. The system includes an adapted eNode 1401 connected to a core network 1408 which communicates data to a plurality of conventional LTE devices 1402 and reduced capability devices 1403 within a coverage area (i.e. cell) 1404. Each of the reduced capability devices 1403 has a transceiver unit 1405 which includes a receiver unit capable of receiving data across a reduced bandwidth and a transmitter unit capable of transmitting data across a reduced bandwidth when compared with the capabilities of the transceiver units 1406 included in the conventional LTE devices 1402.

Figure 15:
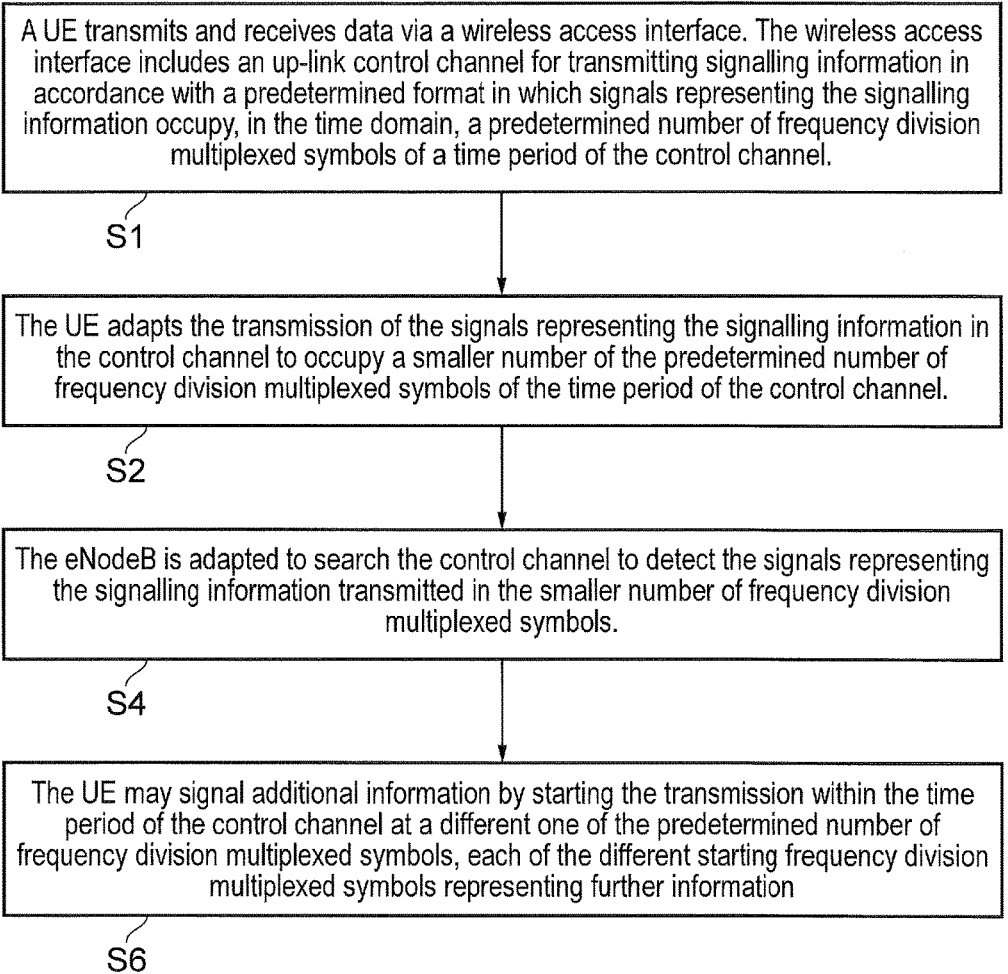
FIG. 15 is a flow diagram illustrating the operation of a communications device transmitting in a control channel in accordance with the present technique.
Figure 16:
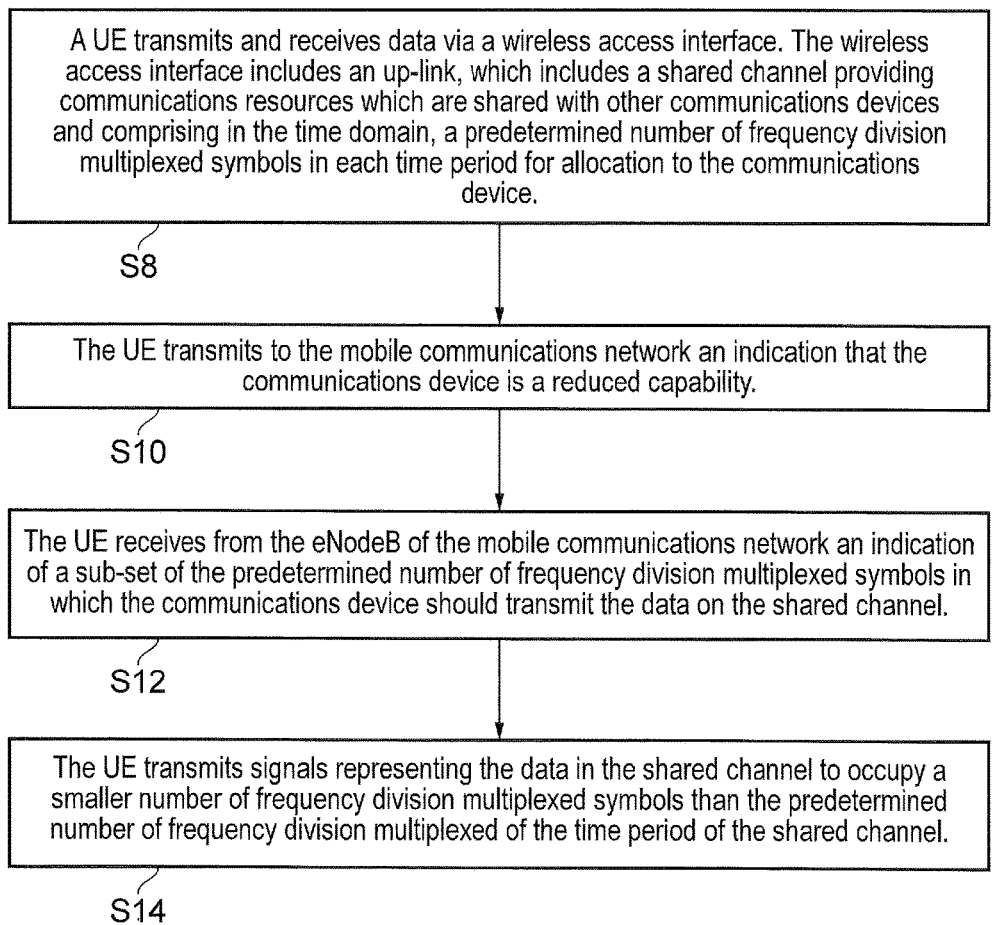
FIG. 16 is a flow diagram illustrating the operation of a communications device transmitting data in a shared channel in accordance with the present technique.

The adapted eNodeB 1401 is configured to allow the reduced capability devices to transmit signals on the Up-link PUCCH or PUSCH using the Flashbulb techniques described above for example with reference to FIGS. 1 to 13. A transmitter and receiver unit 1409 forms a wireless access interface under the control of a controller 1411, which also performs the function of an adapted scheduler. The reduced capability devices 1403 are thus able to receive and transmit data using the up-link in accordance with an operation which can conserve power according to the present technique as summarised by the flow diagram for the PUCCH as shown in FIG. 15 and by the flow diagram for the PUSCH as shown in FIG. 16. FIG. 15 is summarised as follows:

S1: As with a conventional operation a communications device (UE) transmits and receives data via a wireless access interface provided by a mobile communications network. The wireless access interface includes an uplink control channel for transmitting signalling information in accordance with a predetermined format in which signals representing the signalling information occupy a predetermined number of frequency division multiplexed (SC-FDMA) symbols of a time period of the control channel. The time period may be a sub-frame or a time slot of the sub-frame into which the frame is divided.

S2: The UE adapts the transmission of signals representing the signalling information in the control channel to occupy a smaller number of the predetermined number of frequency division multiplexed symbols of the time period of the control channel. By reducing the transmission time by transmitting signalling information in a smaller number of frequency division multiplexed symbols than are available on the control channel then there is a corresponding reduction in power consumption.

S4: An eNodeB of the mobile communications network is adapted to search the control channel to detect the signals representing the signalling information which has been transmitted in the smaller number of frequency division multiplexed symbols.

S6: Optionally in one example, the UE varies the starting symbol in which the reduced number of frequency division multiplexed symbols are transmitted between one of a plurality of predetermined start symbols. Thus each different starting frequency division multiplexed symbol provides an indication of further information. In one example, the further information forms part of the signalling information which is being transmitted.

FIG. 16 provides an example illustration of the operation of another example embodiment where the UE transmits data on a shared channel (PUSCH) of the wireless access interface provided by the mobile communications network and a corresponding reduction in power consumption is achieved. The operation of a UE is for this example embodiment represented in FIG. 16 which are summarised as follows:

S8: A UE transmits and receives data via a wireless access interface in accordance with a conventional operation. However the wireless access interface includes an uplink with a shared channel providing communications resources which are shared with other communications devices and comprises in the time domain a predetermined number of frequency division multiplexed symbols in each time period for allocation to communications devices. Again, the time period may be a sub-frame or a time slot of the sub-frame into which the frame is divided.

S10: The UE transmits to the mobile communications network an indication that the communications device is a reduced capability device. Alternatively, the UE transmits an indication that it wishes to operate as a flashbulb UE or provide some indication that the UE is to reduce a number of frequency division multiplexed symbols which are available for transmission on the shared channel.

S12: The UE receives from the eNodeB of the mobile communications network an indication of a subset of the predetermined number of frequency division multiplexed symbols in which the communications device should transmit the data on the shared channel. The indication of the subset of frequency division multiplexed symbols, in one example, can be transmitted on a broadcast signal or provided at call setup or may be provided in response to each request for grant of uplink shared channel resources.

S14: The UE then transmits signals representing the data in the shared channel to occupy a smaller number of the frequency division multiplexed symbols than the number which are available within the time period of the shared channel.

Various further aspects and features of the present disclosure are defined in the appended claims. Various combinations of the features of the dependent claims may be made with those of the independent claims other than the specific combinations recited for the claim dependency. Although embodiments of the present disclosure have been described with reference to LTE, it will be appreciated that other embodiments find application with other wireless communication systems such as UMTS.

The following numbered clauses provide further example aspects:

1. A communications device for transmitting data to or receiving data from a mobile communications network, the mobile communications network including one or more network elements which are arranged to form a wireless access interface for transmitting and receiving the data, the communications device comprising a transmitter unit configured to transmit signals representing the data on an up-link of the wireless access interface to the mobile communications network, a receiver unit configured to receive signals representing the data transmitted on a down-link from the mobile communications network via the wireless access interface, the wireless access interface providing a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols, wherein the up-link includes a shared channel providing the communications resources for allocation to the communications device by the mobile communications network for transmitting the data on the up-link to the mobile communications network, the shared channel providing communications resources which are shared with other communications terminals and comprising in the time domain, the predetermined number of frequency division multiplexed symbols in each time period for allocation to the communications device, and a controller configured to control the transmitter unit to transmit the signals and the receiver unit to receive the signals to transmit or receive the data, wherein the controller is configured to control the transmitter unit and the receiver unit to transmit to the mobile communications network a request to transmit data in a smaller number of frequency division multiplexed symbols than are available on the shared channel, to receive from the mobile communications network an indication of a sub-set of the predetermined number of frequency division multiplexed symbols in which the communications device should transmit the data on the shared channel, and to transmit signals representing the data in the shared channel to occupy a smaller number of frequency division multiplexed symbols than the number of the predetermined number of frequency division multiplexed symbols of the time period of the shared channel.

2. A communications device according to clause 1, wherein the controller is configured to transmit the signals representing the data in the smaller number of frequency division multiplexed symbols within the time period of the shared channel starting at a different one of the predetermined number of frequency division multiplexed symbols, each of the different starting frequency division multiplexed symbols representing further information.

3. A communications device according to clause 1 or 2, wherein the controller is configured to transmit the signals representing the data with one or more reference symbols included in the number of frequency division multiplexed symbols to assist in demodulating the received signal to recover the data, and a position of the one or more reference symbols within the transmitted frequency division multiplexed symbols is varied between a plurality of locations within the transmitted symbols, each of the locations representing further information.

4. A communications device according to clause 2 or 3, wherein the further information forms part of the data being transmitted by the controller.

5. A communications device according to any of clauses 1 to 4, wherein the shared channel comprises a plurality of frequency division multiplexed symbols in the time domain and a plurality of sub-carriers in the frequency domain and transmission of the signalling information includes a contiguous sub-set of the frequency division multiplexed symbols starting at one of the predetermined frequency division multiplexed symbols.

6. A communications device according to any of clauses 1 to 5, wherein the controller is configured to transmit the data by mapping data symbols representing the frequency division multiplexed symbols by modulating the sub-carriers of the shared channel with modulation symbols representing the data symbols, the modulation order of the modulation symbols being so that the data can be transmitted in a temporal length which is less than the temporal length of the time period of the shared channel.

7. A communications device according to any of clauses 1 to 6, wherein the time period of the shared channel is formed from a sub-frame of a frame into which the up-link is divided.

8. A communications device according to clause 7, wherein the shared channel is formed from two time slots into which the sub-frame is divided and the predetermined number of frequency division multiplexed symbols is the number of symbols in one of the time slots.

9. A communications device according to any of clauses 1 to 9, wherein the controller is configured in combination with the receiver unit to receive control information from the mobile communications network for configuring the transmission of the signals representing the data in the shared channel, whereby other communications devices can be configured to adapt transmissions of signals in the same shared channel with the transmission of the signals representing the data by the communications device, and the controller is configured in combination with the transmitter unit to configure the transmitter unit in accordance with the control information received from the mobile communications network to transmit the signals representing the data in the shared channel.

10. A method of transmitting data to or receiving data from a mobile communications network, the mobile communications network including one or more network elements which are arranged to form a wireless access interface for transmitting and receiving the data, the method comprising transmitting signals representing the data on an up-link of the wireless access interface to the mobile communications network, receiving signals representing the data transmitted on a down-link from the mobile communications network via the wireless access interface, the wireless access interface providing a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols, wherein the up-link includes a shared channel providing the communications resources for allocation to the communications device by the mobile communications network for transmitting the data on the up-link to the mobile communications network, the shared channel providing communications resources which are shared with other communications terminals and comprising in the time domain, the predetermined number of frequency division multiplexed symbols in each time period for allocation to the communications device, and controlling the transmitting the signals and the receiving the signals to transmit or receive the data, wherein the controlling the transmitting includes transmitting to the mobile communications network a request to transmit data in a smaller number of frequency division multiplexed symbols than are available on the shared channel, receiving from the mobile communications network an indication of a sub-set of the predetermined number of frequency division multiplexed symbols in which the communications device should transmit the data on the shared channel, and transmitting signals representing the data in the shared channel to occupy a smaller number of frequency division multiplexed symbols than the number of the predetermined number of frequency division multiplexed symbols of the time period of the shared channel.

11. A method according to clause 10, wherein the controlling the transmitting includes transmitting the signals representing the data in the smaller number of frequency division multiplexed symbols within the time period of the shared channel starting at a different one of the predetermined number of frequency division multiplexed symbols, each of the different starting frequency division multiplexed symbols representing further information.

12. A method according to clause 10 or 11, wherein the controlling the transmitting includes transmitting the signals representing the data includes transmitting one or more reference symbols included in the number of frequency division multiplexed symbols to assist in demodulating the received signal to recover the data, and varying a position of the one or more reference symbol within the transmitted frequency division multiplexed symbols between a plurality of locations within the transmitted symbols, each of the locations representing further information.

13. A method according to clause 11 or 12, wherein the further information forms part of the data being transmitted by the controller.

14. An infrastructure equipment for forming part of a mobile communications network and providing a wireless access interface for transmitting data to and receiving data from a communications device, the infrastructure equipment comprising a transmitter unit configured to transmit signals representing the data on a down-link of the wireless access interface to the mobile communications network, a receiver unit configured to receive signals representing the data transmitted on an up-link from the mobile communications network via the wireless access interface, the wireless access interface providing a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols, wherein the up-link includes a shared channel providing the communications resources for allocation to the communications device by the infrastructure equipment for transmitting the data on the up-link to the infrastructure equipment, the shared channel providing communications resources which are shared with other communications terminals and comprising in the time domain, the predetermined number of frequency division multiplexed symbols in each time period for allocation to the communications device, and a controller configured to control the receiver unit to receive the signals and the transmitter unit to transmit the signals to transmit or receive the data, wherein the controller is configured to control the transmitter unit and the receiver unit to receive from a communications device a request to transmit data in a smaller number of frequency division multiplexed symbols than are available on the shared channel, to transmit to the communications device an indication of a sub-set of the predetermined number of frequency division multiplexed symbols in which the communications device should transmit the data on the shared channel, and to receive signals representing the data in the shared channel within a smaller number of frequency division multiplexed symbols than the number of the predetermined number of frequency division multiplexed symbols of the time period of the shared channel.

15. An infrastructure equipment according to clause 14, wherein the controller is configured to receive the signals representing the data in the smaller number of frequency division multiplexed symbols within the time period of the shared channel starting at a different one of the predetermined number of frequency division multiplexed symbols, each of the different starting frequency division multiplexed symbols representing further information.

16. An infrastructure equipment according to clause 14 or 15, wherein the controller is configured to receive the signals representing the data in the smaller number of frequency division multiplexed symbols within the time period of the shared channel, the received signals representing the data with one or more reference symbols included in the number of frequency division multiplexed symbols to assist in demodulating the received signal to recover the data, the one or more reference symbols transmitted with the data bearing symbols varying in location with respect to a position of the data bearing symbols, each of the locations representing further information, and the controller is configured to detect the further information based on the location of the one or more reference symbols.

The invention claimed is:

1. A communications device for transmitting data to or receiving data from a mobile communications network, the mobile communications network including one or more network elements which are arranged to form a wireless access interface for transmitting and receiving the data, the communications device comprising:

a transmitter configured to transmit signals representing the data on an up-link of the wireless access interface to the mobile communications network, a receiver configured to receive signals representing the data transmitted on a down-link from the mobile communications network via the wireless access interface, the wireless access interface providing a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols, wherein the up-link includes a shared channel providing the communications resources for allocation to the communications device by the mobile communications network for transmitting the data on the up-link to the mobile communications network, the shared channel providing communications resources which are shared with other communications terminals and comprising in the time domain, the predetermined number of frequency division multiplexed symbols in each time period for allocation to the communications device, and a controller configured to control the transmitter to transmit the signals and the receiver to receive the signals to transmit or receive the data, wherein the controller is configured to control the transmitter and the receiver to
transmit to the mobile communications network a request to transmit data in a smaller number of frequency division multiplexed symbols than are available on the shared channel,
receive from the mobile communications network an indication of a sub-set of the predetermined number of frequency division multiplexed symbols in which the communications device should transmit the data on the shared channel, and
transmit signals representing the data in the shared channel to occupy a smaller number of frequency division multiplexed symbols than the number of the predetermined number of frequency division multiplexed symbols of the time period of the shared channel, wherein
the controller is configured to transmit the signals representing the data in the smaller number of frequency division multiplexed symbols within the time period of the shared channel starting at a different one of the predetermined number of frequency division multiplexed symbols, each of the different starting frequency division multiplexed symbols representing further information.

2. The communications device of claim 1, wherein the controller is configured to transmit the signals representing the data with one or more reference symbols included in the number of frequency division multiplexed symbols to assist in demodulating the received signal to recover the data, and a position of the one or more reference symbols within the transmitted frequency division multiplexed symbols is varied between a plurality of locations within the transmitted symbols, each of the locations representing further information.

3. The communications device of claim 1, wherein the further information forms part of the data being transmitted by the controller.

4. The communications device of claim 1, wherein the shared channel comprises a plurality of frequency division multiplexed symbols in the time domain and a plurality of sub-carriers in the frequency domain and transmission of the signaling information includes a contiguous sub-set of the frequency division multiplexed symbols starting at one of the predetermined frequency division multiplexed symbols.

5. The communications device of claim 1, wherein the controller is configured to transmit the data by mapping data symbols representing the frequency division multiplexed symbols by modulating the sub-carriers of the shared channel with modulation symbols representing the data symbols, the modulation order of the modulation symbols being so that the data can be transmitted in a temporal length which is less than the temporal length of the time period of the shared channel.

6. The communications device of claim 1, wherein the time period of the shared channel is formed from a sub-frame of a frame into which the up-link is divided.

7. The communications device of claim 6, wherein the shared channel is formed from two time slots into which the sub-frame is divided and the predetermined number of frequency division multiplexed symbols is the number of symbols in one of the time slots.

8. The communications device of claim 1, wherein the controller is configured in combination with the receiver to
receive control information from the mobile communications network for configuring the transmission of the signals representing the data in the shared channel, whereby other communications devices can be configured to adapt transmissions of signals in the same shared channel with the transmission of the signals representing the data by the communications device, and
the controller is configured in combination with the transmitter to configure the transmitter in accordance with the control information received from the mobile communications network to transmit the signals representing the data in the shared channel.

9. A method of transmitting data to or receiving data from a mobile communications network, the mobile communications network including one or more network elements which are arranged to form a wireless access interface for transmitting and receiving the data, the method comprising:
transmitting signals representing the data on an up-link of the wireless access interface to the mobile communications network,
receiving signals representing the data transmitted on a down-link from the mobile communications network via the wireless access interface, the wireless access interface providing a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols, wherein the up-link includes a shared channel providing the communications resources for allocation to the communications device by the mobile communications network for transmitting the data on the up-link to the mobile communications network, the shared channel providing communications resources which are shared with other communications terminals and comprising in the time domain, the predetermined number of frequency division multiplexed symbols in each time period for allocation to the communications device, and
controlling the transmitting the signals and the receiving the signals to transmit or receive the data, wherein the controlling the transmitting includes transmitting to the mobile communications network a request to transmit data in a smaller number of frequency division multiplexed symbols than are available on the shared channel, receiving from the mobile communications network an indication of a sub-set of the predetermined number of frequency division multiplexed symbols in which the communications device should transmit the data on the shared channel, and transmitting signals representing the data in the shared channel to occupy a smaller number of frequency division multiplexed symbols than the number of the predetermined number of frequency division multiplexed symbols of the time period of the shared channel, wherein the controlling the transmitting includes transmitting the signals representing the data in the smaller number of frequency division multiplexed symbols within the time period of the shared channel starting at a different one of the predetermined number of frequency division multiplexed symbols, each of the different starting frequency division multiplexed symbols representing further information.

10. The method of claim 9, wherein the controlling the transmitting includes transmitting the signals representing the data includes transmitting one or more reference symbols included in the number of frequency division multiplexed symbols to assist in demodulating the received signal to recover the data, and varying a position of the one or more reference symbol within the transmitted frequency division multiplexed symbols between a plurality of locations within the transmitted symbols, each of the locations representing further information.

11. An infrastructure equipment for forming part of a mobile communications network and providing a wireless access interface for transmitting data to and receiving data from a communications device, the infrastructure equipment comprising:

a transmitter configured to transmit signals representing the data on a down-link of the wireless access interface to the mobile communications network, a receiver configured to receive signals representing the data transmitted on an up-link from the mobile communications network via the wireless access interface, the wireless access interface providing a plurality of communications resource elements across a frequency range for the down-link and the up-link, the communications resource elements being formed by dividing sub-carriers at different frequencies into a plurality of time periods, one or more of the sub-carriers being provided to form, in the time domain, frequency division multiplexed symbols, each of the time periods comprising a predetermined number of the frequency division multiplexed symbols, wherein the up-link includes a shared channel providing the communications resources for allocation to the communications device by the infrastructure equipment for transmitting the data on the up-link to the infrastructure equipment, the shared channel providing communications resources which are shared with other communications terminals and comprising in the time domain, the predetermined number of frequency division multiplexed symbols in each time period for allocation to the communications device, and a controller configured to control the receiver to receive the signals and the transmitter to transmit the signals to transmit or receive the data, wherein the controller is configured to control the transmitter and the receiver to receive from a communications device a request to transmit data in a smaller number of frequency division multiplexed symbols than are available on the shared channel, transmit to the communications device an indication of a sub-set of the predetermined number of frequency division multiplexed symbols in which the communications device should transmit the data on the shared channel, and receive signals representing the data in the shared channel within a smaller number of frequency division multiplexed symbols than the number of the predetermined number of frequency division multiplexed symbols of the time period of the shared channel, wherein the controller is configured to receive the signals representing the data in the smaller number of frequency division multiplexed symbols within the time period of the shared channel starting at a different one of the predetermined number of frequency division multiplexed symbols, each of the different starting frequency division multiplexed symbols representing further information.

12. The infrastructure equipment of claim 11, wherein the controller is configured to receive the signals representing the data in the smaller number of frequency division multiplexed symbols within the time period of the shared channel, the received signals representing the data with one or more reference symbols included in the number of frequency division multiplexed symbols to assist in demodulating the received signal to recover the data, the one or more reference symbols transmitted with the data bearing symbols varying in location with respect to a position of the data bearing symbols, each of the locations representing further information, and the controller is configured to detect the further information based on the location of the one or more reference symbols.

* * * * *